US010373152B2

(12) United States Patent
Makhotin et al.

(10) Patent No.: US 10,373,152 B2
(45) Date of Patent: Aug. 6, 2019

(54) INTEGRATED MOBILE TRUSTED SERVICE MANAGER

(71) Applicant: VISA INTERNATIONAL SERVICE ASSOCIATION, San Francisco, CA (US)

(72) Inventors: Oleg Makhotin, Danville (CA); Eduardo Lopez, Menlo Park, CA (US); Erick Wong, Menlo Park, CA (US)

(73) Assignee: Visa International Service Association, San Francisco, CA (US)

( * ) Notice: Subject to any disclaimer, the term of this patent is extended or adjusted under 35 U.S.C. 154(b) by 1577 days.

(21) Appl. No.: 13/713,938

(22) Filed: Dec. 13, 2012

(65) Prior Publication Data

US 2013/0151400 A1    Jun. 13, 2013

Related U.S. Application Data

(60) Provisional application No. 61/653,773, filed on May 31, 2012, provisional application No. 61/570,123, filed on Dec. 13, 2011.

(51) Int. Cl.
*G06Q 20/32* (2012.01)
*H04L 29/06* (2006.01)
(Continued)

(52) U.S. Cl.
CPC ......... *G06Q 20/3227* (2013.01); *G06Q 20/02* (2013.01); *G06Q 20/32* (2013.01);
(Continued)

(58) Field of Classification Search
CPC .. G06Q 20/353; G06Q 20/36; G06Q 20/3226; G06Q 20/3227; G06Q 20/3229; G06Q 20/327
See application file for complete search history.

(56) References Cited

U.S. PATENT DOCUMENTS 5,825,857 A * 10/1998 Reto ................. H04M 15/00
                                                                    379/114.15
5,892,900 A    4/1999 Ginter et al.
(Continued)

FOREIGN PATENT DOCUMENTS

CN    101523849 A    9/2009
JP    4250629    1/2009
(Continued)

OTHER PUBLICATIONS

European Search Report in connection EP Application No. 12858410.9 dated Jul. 14, 2015, 8 pages.
(Continued)

*Primary Examiner* — Steven S Kim
(74) *Attorney, Agent, or Firm* — Kilpatrick Townsend & Stockton LLP

(57) ABSTRACT

Embodiments of the present invention are directed to a centralized trusted service manager system in the form of a trusted service manager interconnectivity service hub, which facilitates and provides communications between entities involved I mobile contactless payment systems. One embodiment is directed to a method for processing a message related to a mobile payment application on a secure element of a mobile communication device through an interconnectivity services hub including receiving the message from a first entity in a first protocol and determining a trusted service manager associated with the secure element from among a plurality of trusted service managers using a routing table comprising routing information. Then the method continues by determining a second protocol corresponding to the trusted service manager associated with the secure element, translating the message into the second protocol, and sending the translated message to the trusted
(Continued)

service manager which communicates with the secure element.

21 Claims, 7 Drawing Sheets

(51) Int. Cl.
*H04W 12/08* (2009.01)
*G06Q 20/02* (2012.01)
*G06Q 20/36* (2012.01)
*H04W 4/50* (2018.01)
*H04W 4/80* (2018.01)

(52) U.S. Cl.
CPC ....... *G06Q 20/327* (2013.01); *G06Q 20/3226* (2013.01); *G06Q 20/3229* (2013.01); *G06Q 20/3278* (2013.01); *G06Q 20/36* (2013.01); *H04L 69/08* (2013.01); *H04W 4/50* (2018.02); *H04W 4/80* (2018.02); *H04W 12/08* (2013.01)

(56) References Cited

U.S. PATENT DOCUMENTS

| | | | | |
|---|---|---|---|---|
| 5,903,652 | A * | 5/1999 | Mital | G06Q 20/04 705/26.25 |
| 6,330,598 | B1 * | 12/2001 | Beckwith | H04Q 3/0029 709/223 |
| 7,233,920 | B1 | 6/2007 | Rodriguez, Jr. et al. | |
| 7,469,151 | B2 | 12/2008 | Khan et al. | |
| 8,060,449 | B1 * | 11/2011 | Zhu | G06Q 20/401 705/14.51 |
| 8,171,525 | B1 | 5/2012 | Pelly et al. | |
| 8,385,553 | B1 * | 2/2013 | Jooste | H04L 9/0822 380/277 |
| 8,447,699 | B2 | 5/2013 | Batada et al. | |
| 8,635,354 | B2 * | 1/2014 | Martino | G06F 17/30893 709/230 |
| 8,769,656 | B2 * | 7/2014 | Corda | G06F 12/1483 705/65 |
| 8,843,125 | B2 * | 9/2014 | Kwon | H04L 63/067 455/419 |
| 9,104,887 | B2 * | 8/2015 | Gargiulo | H04L 9/32 |
| 9,572,025 | B2 | 2/2017 | Arvidsson et al. | |
| 2003/0200184 | A1 * | 10/2003 | Dominguez | G06Q 20/02 705/78 |
| 2003/0236726 | A1 * | 12/2003 | Almonte | G06Q 20/02 705/35 |
| 2004/0008988 | A1 * | 1/2004 | Gerstal | H04B 10/032 398/45 |
| 2006/0118620 | A1 | 6/2006 | Hosogoe | |
| 2006/0224470 | A1 * | 10/2006 | Garcia Ruano | G06Q 20/04 705/26.1 |
| 2006/0291655 | A1 * | 12/2006 | Ogram | H04L 9/0847 380/255 |
| 2007/0067471 | A1 * | 3/2007 | Wolfe | H04L 69/08 709/230 |
| 2008/0167017 | A1 * | 7/2008 | Wentker | G06Q 20/10 455/414.1 |
| 2008/0255947 | A1 * | 10/2008 | Friedman | G06Q 20/20 705/35 |
| 2008/0263187 | A1 * | 10/2008 | Casey | H04L 12/66 709/223 |
| 2009/0049539 | A1 | 2/2009 | Halbedel et al. | |
| 2009/0112747 | A1 | 4/2009 | Mullen et al. | |
| 2010/0049861 | A1 | 2/2010 | Cleghorn et al. | |
| 2010/0275269 | A1 * | 10/2010 | Vilmos | G06F 12/1416 726/28 |
| 2010/0291904 | A1 | 11/2010 | Musfeldt et al. | |
| 2011/0078081 | A1 * | 3/2011 | Pirzadeh | G06Q 20/20 705/44 |
| 2011/0087610 | A1 * | 4/2011 | Batada | G06F 21/72 705/318 |
| 2012/0011067 | A1 * | 1/2012 | Katzin | G06Q 20/027 705/44 |
| 2012/0047237 | A1 | 2/2012 | Arvidsson et al. | |
| 2012/0130838 | A1 | 5/2012 | Koh et al. | |
| 2012/0291095 | A1 * | 11/2012 | Narendra | H04W 4/003 726/3 |
| 2013/0024383 | A1 | 1/2013 | Kannappan | |
| 2013/0111599 | A1 | 5/2013 | Gargiulo et al. | |
| 2013/0262302 | A1 | 10/2013 | Lettow et al. | |
| 2014/0122339 | A1 | 5/2014 | Aabye et al. | |
| 2014/0364095 | A1 * | 12/2014 | Hong | H04L 67/2823 455/414.1 |

FOREIGN PATENT DOCUMENTS

| | | |
|---|---|---|
| JP | 2001016274 | 1/2011 |
| JP | 2011508466 | 3/2011 |
| KR | 100409263 | 12/2003 |
| KR | 10-2010-0024116 A | 3/2010 |
| KR | 20100024116 | 3/2010 |
| RU | 2323477 | 4/2008 |
| WO | 2013090624 | 6/2013 |
| WO | 2013100636 | 7/2013 |

OTHER PUBLICATIONS

International Search Report and Written Opinion of The International Searching Authority issued in Application No. PCT/US2012/069575 dated Apr. 1, 2013, 10 pages.
Japanese Office Action in connection with JP Application No. 2014-547441, filed Dec. 13, 2012, 2 pages.
Chinese Office Action Aug. 26, 2016 in re Chinese Application No. 201280069547.6 filed Dec. 13, 2011, 16 pages (with English summary).
U.S. Appl. No. 14/275,775 , "Non Final Office Action", dated Apr. 7, 2017, 20 pages.
AU2012352157 , "First Examination Report", dated May 12, 2017, 3 pages.
EP12858410.9 , "Office Action", dated Jun. 13, 2018, 7 pages.
JP2014-547441 , "Office Action", dated Oct. 6, 2017, 6 pages.
KR2014-7019402 , "Office Action", dated Jun. 15, 2018, 13 pages.
RU2014128632, "Decision of Grant" dated May 4, 2017. * pages.
Tae-Hyun , "Discussion on the Role of NFC Mobile Payment Service Ecosystem and TSM", Korea Information Society Development Institute, vol. 23, No. 18, Serial No. 517, Oct. 1, 2011, pp. 1-34.
KR2014-7019402, "Notice of Decision to Grant", dated Apr. 29, 2019, 3 pages.

* cited by examiner

INTEGRATED MOBILE TRUSTED SERVICE MANAGER

CROSS-REFERENCES TO RELATED APPLICATIONS

This application claims the benefit of U.S. Provisional Application No. 61/570,123, filed Dec. 13, 2011, and U.S. Provisional Application No. 61/653,773, filed May 31, 2012, which are both herein incorporated by reference in their entirety for all purposes.

BACKGROUND

In current mobile contactless transaction environments, each financial institution (e.g., an issuer) of a payment device associated with a mobile communication device or mobile wallet has its own trusted service manager (TSM) in order to communicate with a secure element (SE) trusted service manager for that mobile communication device. The secure element (SE) allows the mobile communication device to gain benefit of a near-field communication (NFC) reader, which are located at merchant locations for conducting contactless transactions. In the current mobile transaction industry, the trusted service manager (TSM) providers provide end-to-end solutions by connecting individual entities, each of which is subject to particular business arrangements and each of which communicates in a particular protocol.

As more payments evolve from physical cards into electronic forms of payment, and more entities enter the mobile contactless payment ecosystem and support mobile contactless payments, what is needed is an extension to the present mobile transaction network to facilitate distribution of these mobile payment devices and support for the mobile applications and accounts associated with those mobile communication devices. Additionally, what is needed is a central communication point between such entities that can provide the same security as the plurality of aforementioned trusted service managers and can communicate in the same protocol as each entity.

Embodiments of the present invention address these problems and other problems individually and collectively.

BRIEF SUMMARY

Embodiments of the present invention are directed to a centralized trusted service manager system in the form of a trusted service manager interconnectivity service hub, which facilitates and provides communications between financial institutions (e.g., issuer banks), trusted service managers associated with issuers, and trusted service managers associated with for secure element (SE) owners, such as mobile network operators (e.g., carriers or providers), original equipment manufacturers (OEMs), and others having access to secure elements on a mobile communication device. The hub provides an interoperability domain for a near-field communication (NFC) system, which securely connects an issuer to the mobile infrastructure (and mobile communication devices) in order to enable any given account for a particular mobile communication device. In one embodiment, the hub may integrate a mobile trusted service managers that may operate on an issuer or service provider's behalf.

The hub includes a routing table module for determining a destination address and communication protocol for an entity during a transaction or request. Additionally, the hub includes a protocol adapter module for translating each communication between varying interfaces of financial institutions, mobile network operators, wallet providers, and other mobile contactless payment system entities. Furthermore, in order to securely exchange information between each entity (e.g., financial institutions, banks, mobile communication devices, and mobile operators) the hub includes a key management module for providing a key exchange between those entities and the hub.

One embodiment of the present invention is directed to a method for processing a message related to a mobile payment application on a secure element of a mobile communication device through an interconnectivity services hub. The method includes receiving the message from a first entity in a first protocol and determining a trusted service manager associated with the secure element from among a plurality of trusted service managers using a routing table comprising routing information corresponding to predetermined secure element management relationships. Then the method continues by determining a second protocol corresponding to the trusted service manager associated with the secure element, translating the message into the second protocol, and sending the translated message to the trusted service manager which communicates with the secure element.

Another embodiment of the present invention is directed to a server computer comprising a processor and a non-transitory computer readable medium coupled to the processor. The computer readable medium may comprise code executable by the processor for implementing a method for processing a message related to a mobile payment application on a secure element of a mobile communication device through an interconnectivity services hub. The includes receiving the message from a first entity in a first protocol and determining a trusted service manager associated with the secure element from among a plurality of trusted service managers using a routing table comprising routing information corresponding to predetermined secure element management relationships. Then the method continues by determining a second protocol corresponding to the trusted service manager associated with the secure element, translating the message into the second protocol, and sending the translated message to the trusted service manager which communicates with the secure element.

The present invention provides advantages over previous systems because the hub provides issuers with the ability to issue mobile payment credentials to mobile communication devices from multiple issuers, implementing secure elements or contactless payment platforms from multiple secure element owners, and multiple wallet providers, through a single communication point (e.g., the hub). Accordingly, the hub creates a central service for securely connecting multiple entities at both ends of the mobile transaction chain, allowing issuers and secure element owners to bypass a plurality of individual communication paths and business agreements between each issuer and each secure element owner. Embodiments of the present invention provide additionally technical advantages that are discussed in further detail below.

These and other embodiments of the invention are described in further detail below.

DETAILED DESCRIPTION

Figure 1:
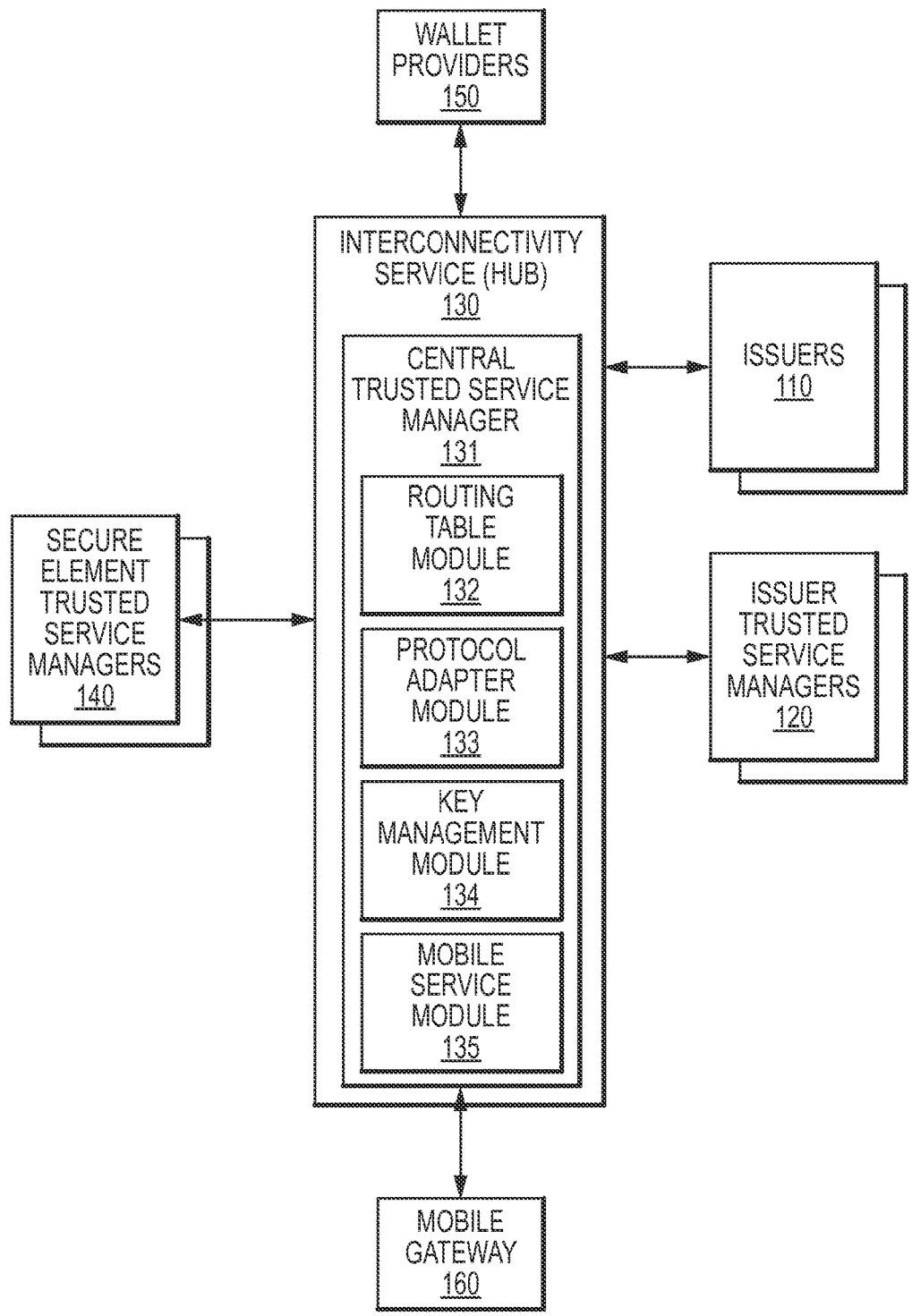
FIG. 1 illustrates a block diagram of a trusted service manager interconnectivity service hub system according to an exemplary embodiment of the present invention.

Embodiments disclosed herein are directed to methods, systems, and apparatuses for providing a trusted service manager interconnectivity service hub ("hub") capable of connecting a plurality of issuers, secure element owners, trusted service managers associated with issuers, trusted service managers associated with secure elements, mobile communication devices comprising secure elements, mobile wallet providers, and any other entities involved in mobile contactless payment systems, through a single connection point. The interconnectivity service hub reduces the technical, operational, and business hurdles associated with establishing relationships between the myriad number of diverse entities in the mobile contactless payment ecosystem and provides a single connection point through which any issuer, service provider, or wallet provider may communicate with a desired secure element on a mobile communication device, without requiring new contracts or business relationships, technical implementation of specific communication protocols, or other infrastructure and implementation costs.

In embodiments of the present invention, a centralized trusted service manager interconnectivity service hub ("hub") may be provided through a central server computer acting as a hub for communications. The hub may facilitate communications between a plurality of entities in order to provision, manage, and provide value added services to entities within a secure mobile contactless payment system. The mobile contactless payment system may be configured to allow secure contactless transactions to be conducted on mobile communication devices using mobile payment applications. The interconnectivity service hub may act as a centralized trusted service manager service at a central communication point for all entities involved in the mobile payment application management and support, such as issuers, secure element owners, trusted service managers, mobile network operators, mobile or digital wallet providers, and any other service providers related to mobile payment applications or systems. Each of the aforementioned entities can connect to the hub in order to access secure information stored on a secure element of any given mobile communication device without engaging in complex and costly business negotiations between each entity to gain access, trust, and control of a secure element on a mobile communication device.

For example, the hub can allow an issuer (or other service provider) to securely manage credentials linked to a user or payment account on a secure element of a mobile communication device. For instance, issuers may wish to communicate with a secure element storing a payment application on a mobile communication device in order to perform requests such as adding (i.e., provisioning) an account, deleting an account, sending an urgent notification regarding the account, and sending special offers to the user associated with the account. The interconnectivity service hub can perform a protocol translation of a request from an issuer and then distribute it to a secure element owner for them to deliver to the customer (e.g., through the secure element of a mobile communication device). In alternative embodiments, the hub can perform the translation and deliver the message, command, or request directly to the mobile application or mobile payment application on a mobile communication device through a mobile gateway, which can also be coupled to the hub. Additionally, in some embodiments, the hub may provide a uniform interface for issuers to request services regarding a secure element, such that the hub may act on behalf of the issuer. Accordingly, the hub may create, manage, and update mobile payment applications on mobile communication devices without requiring issuers to generate all the mobile payment application data that may be used in the mobile payment application.

The hub can additionally allow a service provider, secure element owner, or other entity to remotely manage a mobile communication device, for example, through issuer updates, services changes, mobile payment application upgrades, etc. The hub can further allow a mobile communication device to securely communicate with a mobile network operator and/or an issuer, such as to provide user preferences carried across various networks and platforms, such as those of the issuing bank (e.g., issuer) and the mobile network operator. The hub can also allow for cross-platform communication with an electronic wallet in order for the issuers to be securely connected to the accounts within the wallet. In further embodiments, a mobile gateway may also be connected to the hub in order to provide a number of services to the mobile payment application within the mobile communication devices (e.g., management and issuer updates).

Embodiments of the present invention provide a number of technical advantages including providing a single interconnectivity communication point through which an entity may connect to multiple entities in a mobile contactless payment system. The hub may allow a service provider to complete a request related to a mobile payment application on a secure element while only being connected to a single entity (i.e., the hub). Accordingly, secure element owners may be provided with the technical advantages of being given access to an aggregated pool of issuers without implementing individual protocol compatibility for each entity, issuer, or issuer trusted service manager. Additionally, issuers are provided with the technical advantage of being provided access to numerous secure element owners in order to provision, manage, and provide value added services through multiple mobile network operators and devices. Both the issuers and secure element owners avoid implementation complexities, technology investment and implementation costs, and management problems by connecting to only a single central hub in order to communicate with any mobile payment entity. Furthermore, mobile wallet providers and application service providers are provided with similar advantages due to the easy and efficient connection to multiple entities within a mobile contactless payment system. Additional technical advantages are addressed in further detail below.

Prior to discussing the example embodiments of the invention, a further description of some terms can be provided for a better understanding of the invention.

A "trusted service manager" (TSM) can include any entity that forms a business agreement with another entity in order to manage a service on their behalf. For example, a trusted service manager may include any entity that offers services to support mobile financial services between an issuer and a mobile network operator (MNO), service provider, or other secure element owner in control of a secure element of a mobile communication device. A mobile network operator or secure element owner often creates a secure communication point through a trusted service manager associated with the mobile network operator or service provider that manages and controls a secure element. Accordingly, a trusted service associated with an issuer ("issuer trusted service manager") may communicate with a trusted service manager associated with a secure element ("secure element trusted service manager") in order to communicate any specific request, action, command, or activity to be performed on a portion of a secure element.

The basic functionalities that may be provided by trusted service managers may depend on the type of trusted service manager. For example, a secure element trusted service manager may be responsible for managing secure element keys for installing and configuring a mobile payment application on a secure element using over-the-air (OTA) communications. Issuer trusted service managers may be responsible for activating and personalizing a mobile payment application with a consumer's payment or financial information. For example, upon receiving an activation request from an issuer trusted service manager, a secure element trusted service manager may provision the mobile application or mobile payment application onto the designated secure element within a mobile communication device using over-the-air communications. The trusted service manager may communicate with a trusted service manager application installed on the mobile communication device or directly with a secure element. The issuer trusted service manager may also request that the secure element trusted service manager activate, lock, or unlock a mobile payment application already installed on a secure element on the mobile communication device. Additionally, a secure element trusted service manager or an issuer trusted service manager may provide ongoing secure element platform management and support, as well as ongoing mobile payment application management and support.

A "central trusted service manager" may include a trusted service manager that is associated with the interconnectivity services hub. The central trusted service manager may be physically separate but electrically coupled to the interconnectivity services hub or may be integrated with the interconnectivity services hub. The central trusted service manager may complete any data preparation or generation tasks that a typical trusted service manager may complete. Additionally, the central trusted service manager may communicate with other trusted service managers or may communicate directly with any other entity within the mobile contactless payment system. In some embodiments of the present invention, the central trusted service manager may be utilized to provide trusted service manager duties for issuers that do not have an issuer trusted service manager and do not otherwise prepare the application and provisioning data before sending a message to the interconnectivity services hub. Additionally, the central trusted service manager may comprise a life cycle management (LCM) module to perform maintenance and other functions on mobile payment applications, mobile applications, secure elements, or any other entity in the mobile contactless payment system. The central trusted service manager may also prepare application data or personalize payment applications using a common personalization scheme (CPS), as one of ordinary skill would recognize. Furthermore, the central trusted service manager may be capable of communicating directly with mobile communication devices through trusted service manager applications (or any other applications) using over-the-air communications (OTA) module.

A "mobile payment application" may be an application providing payment capabilities implemented within a mobile communication device. For example, the mobile payment application may be installed in a secure element chip within a NFC-enabled portable communication device. The mobile payment application may be installed within a designated area of the secure element that may be accessed with a particular secure element key or unique derived key (UDK) provided by the secure element or may be installed in another available area on the secure element. The mobile payment application provides the functionality to manage and maintain the consumer's payment information and support mobile payments. During a payment transaction, the mobile payment application may interact with an access device over a contactless interface to enable a mobile payment transaction. The mobile payment application may also support other modes of mobile payments, such as e-commerce, using the mobile communication device. The entity issuing the mobile payment application may be an issuer, mobile wallet provider, payment processing network, or other member of the mobile contactless payment system. The mobile payment application may also interface with an unsecured application or mobile application (MA) on a mobile communication device that allows a user to manage the mobile payment application, interact with a service provider, or otherwise interface with the contactless payment system.

A "secure element" may include any secure memory device such that the data contained on the secure element cannot easily be hacked, cracked, or obtained by an unauthorized entity. For example, the secure element may be an integrated circuit device that is implemented within a near-field communication (NFC) enabled mobile communication device. The secure element may contain embedded smart card-grade applications (e.g., payment, transport, etc.). The secure element may be used by the mobile communication device to host and store data and applications that require a high degree of security. For example, the secure element may be encrypted and may store payment account information, such as account numbers and credentials found in a mobile wallet application or mobile payment application. The secure element may be provided to the mobile communication device by the secure element owner, who may also be the mobile network operator (MNO), original equipment manufacturer (OEM), mobile device manufacturer (MDM), or any other suitable entity. Additionally, the secure element may be either embedded in the handset of the mobile communication device or in a subscriber identity module (SIM) card that may be removable from the mobile communication device. The secure element can also be included in an add-on device such as a micro-Secure Digital (microSD) card or the like.

A "secure element key" can be an authentication key that is used in order to communicate with a secure element. The entity issuing/provisioning the mobile payment application (typically a secure element trusted service manager) may need a secure element key and/or a token to install and personalize the mobile payment application on the secure element. The secure element key may typically be determined and provided by the secure element owner or secure element issuer. However, the secure element key may generally be managed on the secure element issuer's behalf by a personalization bureau or secure element trusted service manager. That is, these secure element keys may be provided by the secure element owner to a secure element trusted service manager. The secure element key may be used to ensure that the secure element is highly secure and that only entities that have the permission of the secure element owner or secure element trusted service manager may communicate or access data on the secure element.

For example, during provisioning of a mobile payment application, an issuer trusted service manager may initiate a provisioning process by sending a request to create a supplementary security domain (SSD) including application personalization information (e.g. a UDK key or mobile application identifier to a secure element trusted service manager through the hub) to a secure element trusted service manager. The secure element trusted service manager may then implement two different processes for provisioning a mobile payment application on a secure element. First, using a simple mode, the secure element trusted service manager may create the security domain for the issuer and provision the mobile payment application to the secure element. The secure element trusted service manager may then send the security domain owner information (including a secure element key) back to the issuer trusted service manager such that the trusted service manager can access or manage the security domain (and corresponding provisioned mobile payment application) of the secure element directly. Accordingly, the mobile payment application may be loaded by the secure element trusted service manager. In embodiments of the present invention, these messages may be passed through the interconnectivity service hub.

Alternatively, in delegated or authorized mode, the secure element trusted service manager may create the security domain on the secure element, may generate a secure element key for the security domain, and may send the secure element key and other information to the issuer trusted service manager. However, the secure element trusted service manager may not provision the mobile payment application. Accordingly, the issuer trusted service manager may provision and personalize the mobile payment application directly by communicating with the secure element using the received secure element key through over-the-air (OTA) communication messages.

However, the secure element trusted service manager may not provide a top level master secure element key, instead only providing a secure element key corresponding to a supplementary issuer domain where the mobile payment application may be installed (normally a temporary key). The secure element trusted service manager may create a secure element key for each issuer (i.e. each issuer may be provided a security domain on the secure element for their use) and may send the secure element key to an issuer trusted service manager through the hub. After, the issuer trusted service manager may take ownership of the security domain and replace the secure element key with a new key (e.g., UDK) to take ownership of the security domain (e.g., the secure element trusted service manager may no longer control the domain of the secure element that has been provided to the issuer) as the secure element trusted service manager no longer has access to the secure element key (e.g., UDK). However, the secure element trusted service manager may still revoke access to the supplementary security domain (e.g., delete the security domain from the secure element) using the master secure element key.

A "secure element owner" or "secure element issuer" may include any entity that owns, issues, provides, or controls a secure element. Secure element owners are typically mobile network operators that distribute mobile communication devices containing secure elements to consumers. However, secure element owners may also include original equipment manufacturers, mobile device manufacturers, near-field communications platform developers (e.g., a secure element NFC chip manufacturer), or any other entity that develops, manufacturers, or otherwise interacts with a mobile communication device.

Secure element owners can provide other entities involved in the contactless mobile payment ecosystem access to their secure element to allow them to load and manage mobile and digital wallets, mobile payment applications, or any other mobile application that benefits from an additional layer of security on a mobile communication device. Accordingly, a secure element owner may control access to the secure element in a mobile communication device. Likewise, a secure element trusted service manager may control access to a secure element on behalf of the secure element owner.

A "mobile application" may be an application that operates on the mobile communication device. The mobile application may provide a user interface for consumer interaction (e.g., to enter and view information) with the mobile payment application and/or mobile wallet. The mobile application also communicates with the mobile payment application to retrieve and return information during the processing of any of a number of services offered to the consumer via the mobile communication device (e.g., completing a transaction, issuer update processing, etc.). Additionally, the mobile application can communicate with the mobile gateway to send and receive over-the-air (OTA) messages.

A "wallet provider" can include any entity that loads, manages, or controls user interface mobile applications or mobile, digital, or cloud-based wallets. Wallet providers may include payment processors, mobile network operators, original equipment manufacturers, mobile device manufacturers, issuers, and merchants. Wallet providers may coordinate provisioning of the mobile wallet on a mobile communication device with secure element owners and issuers to ensure the appropriate payment account and credentials are personalized in the secure element and are available to consumers through the mobile wallet. A wallet provider may control the consumer experience in the mobile wallet operating on a mobile communication device.

An "issuer" can include an account issuer or other service provider that provisions and personalizes mobile payment applications on a secure element. During provisioning, issuers (and issuer trusted service managers) may ensure that they receive authorization from a secure element owner to personalize mobile payment applications on a secure element and may ensure that personalization information is provided to wallet providers to ensure that mobile or digital wallets are properly configured to allow consumer purchases using mobile payment applications on the secure element. Issuers may further control access to the consumer's payment product within a mobile communication device. Issuers may also manage and update information on a mobile payment application.

A "mobile gateway" can include a server computer or a series of server computers that are configured to communicate with mobile communication devices using over-the-air (OTA) messages. The mobile gateway may allow mobile communication devices to access services from an issuer via the hub, such as, for example, issuer updates. Additionally, the mobile gateway may allow mobile payment application issuers to communicate with the mobile communication devices of consumers. The mobile gateway may provide a secure channel over which information can be transmitted securely through the mobile communication device, over the mobile network, and/or over the Internet. Mobile gateways may be implemented by issuers, acquirers, third-party services providers, or trusted service managers and may be integrated with the interconnectivity services hub such that any entity coupled to the hub may be connected to the mobile gateway and subsequently, a mobile communication device.

In order for a mobile gateway to communicate with a mobile payment application, a unique derived key (UDK) may be shared between the mobile gateway and the mobile payment application. Accordingly, in some embodiments, a unique mobile application identifier ("MAID") may be created by a mobile gateway, central trusted service manager, issuer, or an issuer trusted service manager during or prior to a provisioning of a mobile payment application. The MAID may be used to generate a mobile payment application key or unique derived key (UDK) that may be used to establish a secure session between the mobile gateway and the mobile payment application. Accordingly, the UDK may be used to establish a secure channel between mobile gateway and mobile payment application. The mobile gateway may then store the MAID in order to generate the UDK for each communication with the mobile payment application.

The mobile gateway may communicate with the mobile payment application for issuer updates as well as any other time it may be beneficial to send a secure communication to the mobile payment application (or when an issuer may benefit from such a communication). Accordingly, the mobile gateway may communicate with the mobile payment application in order to create a secure session for any reason. For example, an issuer may send secure messages using a secure channel including account statements, account balances, or anything issuers may want to communicate through the secure channel.

An "interconnectivity service system" or "hub" can include any central hub or switch that connects various entities in a mobile payment system to one another. The interconnectivity service system may be integrated with a central trusted service manager or may be electronically coupled to a central trusted service manager that may be capable of completing any number of services typically associated with trusted service managers on behalf of the hub or on behalf of any requesting entity communicating with the hub. The hub may be a server computer or a series of server computers that include various service modules. The service modules may include a key management module, a routing table module, a protocol adapter module, a mobile service module, and a reports module. The modules may be stored on a computer readable medium and each module may be accessed by the central trusted service manager while performing a trusted service manager service for any number of various entities such as a mobile wallet provider, an issuer or other service provider, and a secure element owner. The hub modules may also be capable of securely communicating between the aforementioned entities by communicating via various interface connections (i.e., interfaces), each of which may implement a different communication protocol.

An "interface" may include any connection, electrical coupling, or other hardware or software solution for allowing communication between the hub and an entity in the mobile payment system. An interface may be configured for wireless communication, wired communication, or any other form of communication. The hub may comprise a plurality of interfaces where each interface implements a separate communication protocol. Interfaces may be uniform for certain types of entities that are communicating with the hub, or each interface between the hub and an entity may be customized for that particular entity. For example, an interface for a secure element trusted service manager may use a predetermined communication protocol that was established during an on-boarding process between the trusted service manager and the hub. However, as another example, every interface connection between an issuer and the hub may be uniform, using a predetermined issuer interface protocol. Furthermore, some interfaces may use the same general communication protocol standard or specification (ISIS™, Global Platform™, etc.) but the configuration options for the communication protocol standard may necessitate a customized interface for different entities, even though they are using the same general communication protocol.

A "protocol" may include any communication scheme, pattern, language, or mapping that is shared between two entities such that recognizable information may be shared between two parties. For example, a protocol may be proprietary such that only a hub and the entity communicating with the hub can understand the communication. Alternatively, a protocol may be public with a designated specification and may be designed by a consortium of entities with common goals in order to simplify the communication landscape (e.g., ISIS™ communication protocol). However, protocol standards or specifications may include optional configurations, settings, or other information that may not be uniform between each entity implementing a particular version of the protocol. Accordingly, some entities that implement particular functionality or options within a protocol may not be compatible with other entities that do not implement such versions of the protocol. For example, some value added services provided by secure element trusted service managers may necessitate particular versions of the ISIS™ protocol in order to provision an effective mobile payment application on a secure element. Accordingly, a secure element trusted service manager may have particular trusted service manager requirements in order to complete a request or action.

The hub may implement any number of protocols including, for example, an end-to-end trusted service manager services protocol (protocol 1), ISIS™ proprietary protocol (protocol 2), a hub to central trusted service manager protocol (protocol 3), a hub to mobile gateway protocol (protocol 4), a hub to wallet provider protocol (protocol 5), a Global Platform™ trusted service manager protocol (protocol 6), etc. Some of these protocols may or may not overlap. These and other protocols will be discussed in further detail below.

A "key management module" can include a module that may be stored on a computer readable medium, which provides key exchange and key storage for various entities communicating through the interconnectivity service hub. For example, the key management module can utilize a first key associated with an issuer that is stored on the hub to decode an encrypted message from the issuer and utilize a second key associated with a secure element trusted service manager that is stored on the hub to encode or encrypt the message prior to sending that communication to the secure element trusted service manager. The key management module may store and exchange keys with the various entities the hub may communicate with during an "onboarding" or registration process with the particular entity.

The key management module may also be used to authenticate messages as being sent from a particular entity. The key management module may implement multiple types of authentication for each message depending on a security policy for the requesting or the destination entity. Examples of possible authentication procedures include one-way authentication of the sending party, two-way or mutual authentication, asking and receiving authorization or permission of the destination entity for the action requested by the sending entity, integrity control by ensuring data in the communication was not modified during transmission, encryption of a communication using a shared key, and any other suitable authentication procedure to ensure the requesting party and the destination party are authenticated and authorized to complete a particular request.

A "routing table module" can include an application stored on a computer readable medium that includes or has access to a routing table that is used to determine each destination address to which an electronic communication (e.g., a message including a request or command) is to be sent. Additionally, the routing table module may comprise protocol information for the destination entity such that the hub may determine the protocol the destination entity is capable of understanding. This protocol information may be sent to the protocol adapter module to ensure that a received message is translated into the correct protocol to allow effective communication between two entities using the hub. Accordingly, the routing table module may be used to determine a trusted service manager associated with a secure element owner (i.e., secure element trusted service manager) from among a plurality of trusted service managers using a routing table comprising routing information corresponding to predetermined secure element management relationships. The routing table may comprise identifiers for each entity that is connected or coupled to the hub, addresses for each entity (e.g., a uniform resource locator (URL) or other internet protocol (IP) address, etc.), a protocol indicator for each entity, relationships between entities (e.g., a secure element trusted service manager that may be associated with a particular mobile network operator device identifier), as well as any other relevant information for identifying, processing, and completing communication routing and processing from one entity to another through the hub.

A "protocol adapter module" can include an application stored on a computer readable medium that is capable of receiving a communication from a first interface in a first protocol and translating the communication into a second protocol capable of being sent through a second interface. The first interface and second interface may be connected to any two entities within a mobile contactless payment system. For example, the message received at the first interface may include a request from an issuer to provision a mobile payment application on a mobile communication device in a first protocol. The protocol adapter module may be used to translate the request from the issuer to provision the mobile payment application from the first protocol to a second protocol associated with a secure element trusted service manager that is responsible for communicating with a secure element on the destination mobile communication device.

The protocol adapter module may translate the message through a number of different methods depending on the type of message received from the issuer and the amount of data preparation that the issuer has completed. For example, where issuers complete all of the application data preparation for a mobile payment application, the translation may include identifying the first entity, determining a request by comparing the message to a first entity protocol mapping, and mapping application data in the message according to a secure element trusted service manager protocol mapping for the request. The protocol mappings used by the protocol adapter module may be based on the protocol settings for each interface, may be identified by the routing table module, and/or may be determined during an on-boarding or registration process. For example, each secure element trusted service manager may have peculiarities or features within a protocol. So that each issuer trusted service manager does not need to adopt the protocol for each secure element, the hub may adapt the request sent by the issuer trusted service manager to match a protocol mapping corresponding to the secure element trusted service manager. However, in order for the hub to understand the request sent from the issuer trusted service manager or issuer, the hub may identify the first entity, determine the request using a protocol associated with the first entity, determine a secure element trusted service manager associated with the request and adapt the request accordingly. For instance, even if the protocols are the same between issuer and secure element trusted service manager, the two trusted service managers may use certain commands in different way (e.g., optional calls being mandatory, data elements used differently, etc.). Accordingly, the hub may adapt the protocol for both messages and send the messages between the different entities.

However, in some embodiments the translation may include determining a request based on uniform commands in a message and generating application data to be included in a translated message, based on a secure element trusted service manager protocol mapping for the request. Accordingly, in some embodiments of the present invention, the protocol adapter may be involved in application data preparation based on a received request from an issuer or other entity. Furthermore, in some embodiments of the present invention, instead of the first entity having a particular protocol mapping, the first entity may use a uniform interface for issuers, that comprise a uniform set of abstract messages that may be used to generate commands or requests that may be recognized by the hub as comprising particular information. The hub (including the central trusted service manager) may then generate the particular messages and application data including keys, mobile application identifier, etc. in order to complete the request based on the requirements of the second protocol mapping associated with the secure element trusted service manager.

Finally, in some embodiments of the present invention, the translation may include determining a request based on uniform commands in the message, generating a plurality of translated messages including application data based on a range of available secure element trusted service manager requirements, and selecting the correct translated message from the plurality of translated messages for the trusted service manager associated with the secure element. Accordingly, in some embodiments of the present invention, neither the first entity (e.g., issuer or service provider), nor the secure element trusted service manager may have a predetermined protocol mapping. Instead the protocol adapter may orchestrate the correct translation through trial and error with multiple messages based on possible secure element trusted service manager requirements. In this manner, the integration of new secure element trusted service managers is simplified as a protocol mapping is not required and any type of secure element trusted service manager may be implemented without large integration and overhead costs. Accordingly, the hub may dynamically support a range of secure element trusted service management requirements so that integration of secure element trusted service managers is simplified. As such, a custom connection or interface between each secure element trusted service manager is no longer required and a single interface may implement all secure element trusted service managers.

Accordingly, although each secure element trusted service manager may support a different set of use cases, commands, sequence of commands, etc., a single issuer trusted service manager protocol may be implemented using the orchestration engine. For example, each secure element trusted service manager may use a specific or unique version of the protocol for each secure element. In order for the issuer trusted service manager to avoid the situation where the issuer secure element trusted service manager has to support multiple protocols for each secure element, the hub may implement an orchestration process and convert the issuer trusted service manager protocol into multiple secure element trusted service manager protocols so that the issuer trusted service manager may support only one protocol instead of multiple protocols. Furthermore, the hub may complete tasks (data preparation, communicating with a secure element directly, or any other action or command) on behalf of the issuer trusted service manager or secure element trusted service manager depending on the protocol that matches the secure element trusted service manager.

For example, each combination of a secure element and a secure element trusted service manager may have different capabilities because each secure element may be unique and each secure element trusted service manager may be unique and may support different protocols. However, using the orchestration engine embodiment of the protocol adapter, the issuer trusted service manager may support any combination of secure element and secure element trusted service manager protocols and the central trusted service manager may perform any data preparation necessary for the provisioning of a mobile payment application. For example, the central trusted service manager may complete some requests on behalf of the issuer in order to support both the secure element trusted service manager and the issuer or issuer trusted service manager's pre-determined protocols. Additionally, any secure element combination of protocols or commands may be integrated using the plurality of generated messages with a single interface for each issuer trusted service manager and a single interface for each secure element trusted service manager.

Additionally, it may be possible that a secure element trusted service manager and an issuer trusted service manager may both communicate using the same protocol. However, the issuer trusted service manager and the secure element trusted service manager may be using different versions of the protocol such that requests and commands may not be recognized or may be lacking necessary information. For example, some entities may mandate a particular field in a protocol even though the field is defined as optional in the protocol specification or the entities may use different values for parameters defined as generic. Accordingly, protocol translation may be implemented even when two entities are implementing the same general protocol specifications.

A message or communication may include any electronic communication using any communication protocol sent from one entity to another. The message may include application data for configuring a mobile payment application as well as information for issuer updates to mobile payment applications. The issuer updates may include card parameter updates, blocking or unblocking of the mobile payment application, disabling the payment ability of a mobile payment application, and unblocking or changing a passcode used to authenticate the identity of the consumer and/or the mobile communication device. Additionally, the message may include a request for value-added services provided by the issuer including inquires about balances of accounts corresponding to mobile payment applications, adding, limiting, or other instructions regarding pre-paid amounts associated with mobile payment applications, as well as requests and delivery of dynamic card verification values for use in card-not-present transactions. Accordingly, the messages may include requests and commands including issuer application updates, balance updates, updating parameters for the mobile communication device, blocking a respective mobile payment application on the mobile communication device, unblocking the respective mobile payment application, disabling payment functionality on the mobile communication device, unblocking a passcode on the mobile communication device, changing the passcode on the mobile communication device, or setting the passcode to a default passcode.

In some embodiments, "application data" may include any information needed to complete a request or command related to a mobile application. For example, application data may include application personalization information, an application identifier, a secure element trusted service manager identifier, a client identifier, a mobile communication device identifier, or any other information that may be needed to complete a request or command. Additionally, the application data may change depending on the type of request or command being sent.

"Application personalization information" may include application information related to a payment account that is used to provision a new mobile payment application. For example, application personalization information may identify a consumer's account at an issuer such that the consumer's account may be identified during a payment transaction. In some embodiments, the central trusted service manager may generate, receive, or otherwise request application personalization information as part of a request or command sent from an issuer or wallet provider. As such, the hub may receive application personalization information from an application personalization preparation service, which uses a master key to generate a unique derived key (UDK) for a mobile payment application using a mobile payment application identifier (MAID) that is unique to the mobile payment application. The application personalization service may send the application information to the hub which may send the application personalization information to the secure element trusted service manager in the translated message. The secure element trusted service manager may then use the application personalization information to provision a new payment application on the secure element. Additionally, the hub may send the application personalization information to an issuer or wallet provider such that the issuer or wallet provider may update their consumer records to show the new payment data as activated in a mobile payment application. Additionally, in embodiments where the central trusted service manager completes the personalization or provisioning of the mobile payment application on the secure element directly, the central trusted service manager may provision the application using the personalization information using over-the-air messages with the mobile communication device.

A "mobile communication device" may include any device capable of communicating with another device over a communications network. For example, a mobile communication device may include cellular or wireless phones, smart phones, tablets, personal digital assistants (PDAs), pagers, portable computers, and the like.

An "application" may be computer code or other data stored on a computer readable medium (e.g. memory element or secure element) that may be executable by a processor to complete a task. An "applet" can be a simplified application that may be programmed to perform a single or limited specific number of tasks.

I. Exemplary Systems

Referring now to FIG. 1, an exemplary trusted service manager interconnectivity service hub 130 is shown in a mobile contactless payment system 100. As shown, the interconnectivity service hub 130 is a central communication point between various entities involved when initiating, managing, or servicing a mobile contactless payment application in a mobile contactless payment system. For example, the hub 130 can be in communication with various issuers 110 as well as various issuer trusted service managers 120. The hub 130 can leverage the communication path to issuers 110 in order to facilitate the communication with a secure element trusted service manager by requesting additional information in the electronic communications received from the issuers 110 and their trusted service managers 120. The hub 130 may translate a communication into a protocol or language that is recognized by the secure element trusted service manager so that the secure element trusted service manager may communicate the request or command to a secure element, secure element owner, or mobile communication device 180.

The hub 130 can also receive various messages regarding mobile payment accounts located on a secure element of mobile communication devices 180 capable of conducting contactless, or contactless transactions, with NFC-enabled readers at merchant locations (not shown). Accordingly, the hub 130 can also be in communication with various secure element trusted service managers that secure the communication with the secure elements on mobile communication devices 180, in order to securely send communications from issuers 110 having payment accounts stored on those mobile communication devices. In this way, the hub 130 acts as a central trusted service manager 131 for issuers 110, a mobile gateway 160, wallet providers 150, and mobile network operators (not shown).

As such, the hub 130 can also be coupled to a mobile (or digital) wallet through wallet providers 150. Digital or mobile wallets store various payment accounts for a user of a mobile communication device. As such, the hub 130 can act as the secure communication link between issuers 110, issuer trusted service managers 120, and wallet providers 150, such that the hub 130 may help issuers 110 and issuer trusted service managers 120 provide and manage accounts and mobile payment applications to the mobile wallet 150. The hub 130 can further be in communication with a mobile gateway 160, which provides a communication path to the various mobile network operators (not shown) and service providers (not shown) of mobile communication devices (not shown). In some embodiments, the secure communication from the issuers 110 can be forwarded through the mobile gateway 160 to a service provider (not shown) or other mobile communication device secure element owner or secure element trusted service manager 140, who then can send the communication to the secure element (not shown) in a particular protocol.

Figure 2:
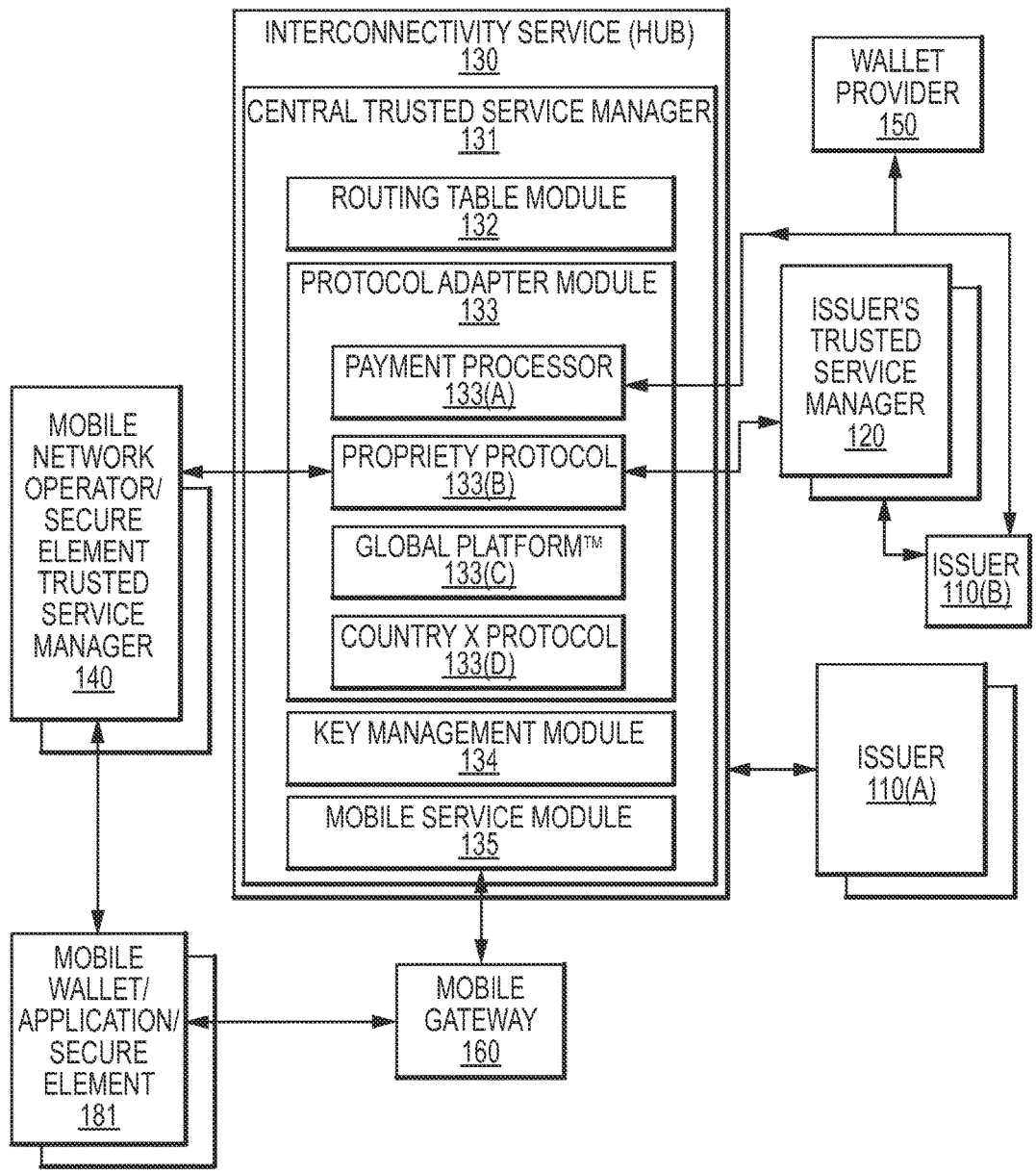
FIG. 2 illustrates a block diagram of a trusted service manager interconnectivity service hub system in another embodiment of the present invention.
Figure 3:
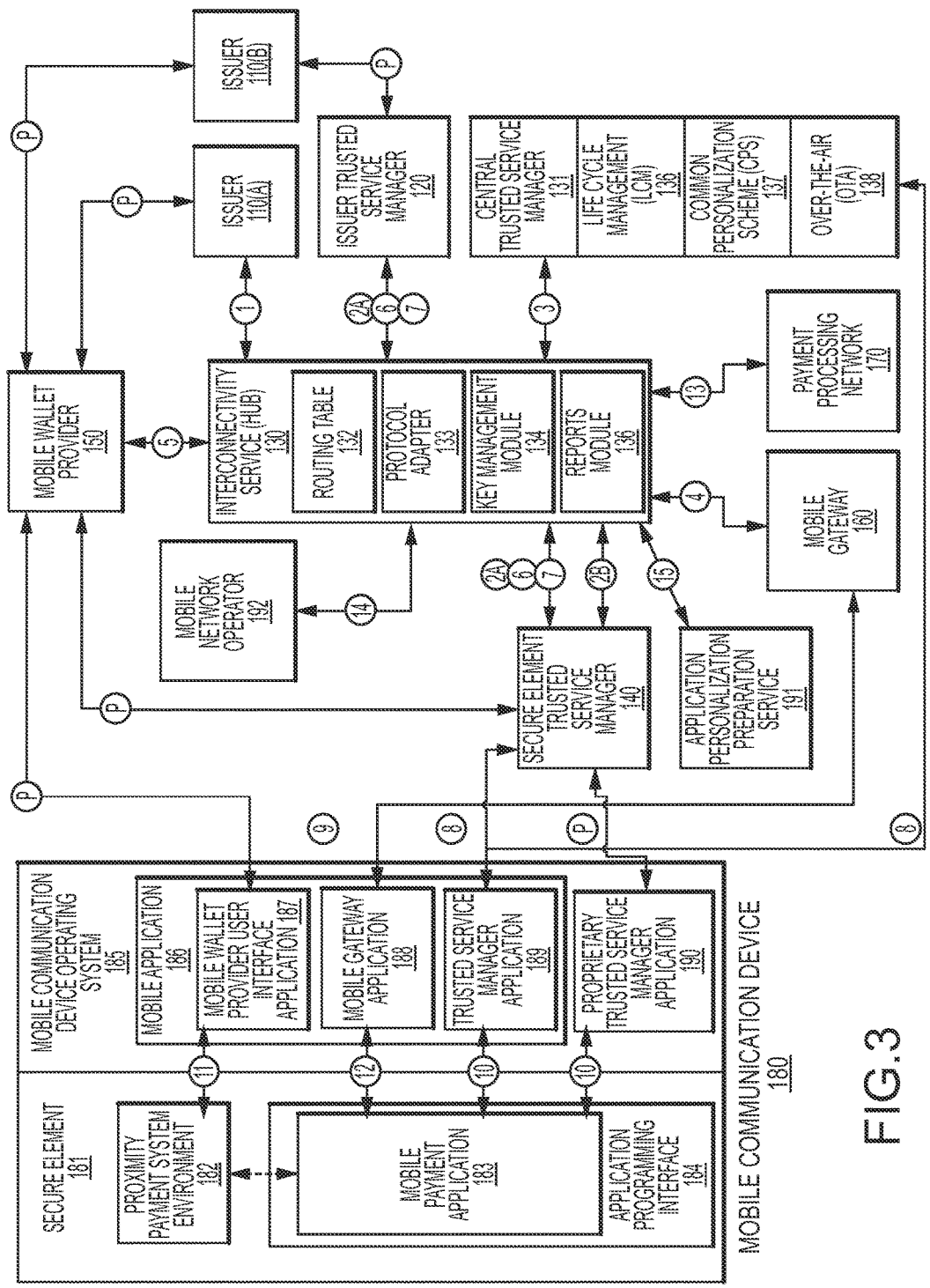
FIG. 3 illustrates a block diagram of exemplary protocols utilized in a mobile contactless payment system including an exemplary trusted service manager interconnectivity service hub according to exemplary embodiments of the present invention.

In order to properly manage the communication between the various entities, the hub 130 can include various application modules along with the central trusted service manager 131. The modules may be part of the central trusted service manager 131 (as shown in FIGS. 1 and 2) or may be separate from the central trusted service manager 131 (as shown in FIG. 3). The modules may include a routing table module 132, a protocol adapter module 133, a key management module 134, and a reporting module 135. The modules may allow for the proper routing, protocol, and security measures to be taken when both receiving and sending an electronic communication, or message, between two or more entities. For example, after receiving an electronic communication from an issuer 110, a key management module 134 can decode the secure message based on a stored key for the sending issuer 110. Next, a routing table module 132 can determine which mobile network operator the electronic message is to be sent to using the mobile service module 135, may determine a corresponding secure element trusted service manager for that mobile network operator, and may determine a protocol for that secure element trusted service manager. The message can then be processed through a protocol adapter module 133 in order to translate the message into the proper protocol for delivery (i.e., a protocol which can be interpreted by the recipient). The protocol adapter module 133 can additionally translate the message dependent on the country of origin standards and the country of delivery standards (if they differ) or any other possible protocol differences that may be necessary for a successful communication with the recipient.

Once the message has been translated into the proper delivery protocol, the key management module 134 can again be utilized in order to secure the message using the stored key for the secure element trusted service manager 140 for the mobile communication device 180 to which the message is to be delivered. The encoded translated message in the proper recipient protocol can then be sent to the recipient using a routing address determined from the routing table module 132. The routing table module 132 may store the addresses of the various entities in communication with the hub 130. For example, the message can be delivered to a secure element trusted service manager 140, a mobile wallet provider 150, or to a mobile network operator or mobile communication device 180 through the mobile gateway 160.

Additionally, the system may function bi-directionally, also allowing secure electronic communication between mobile wallet providers 150, mobile network operators and service providers (not shown), mobile communication devices (not shown), and issuers 110. For example, an issuer may initiate a request to delete a mobile payment application on a mobile communication device or a user may use their mobile communication device to initiate a request to an issuer to delete a mobile payment application. Both messages would be sent and received through the interconnectivity service hub 130. Accordingly, any of the entities may send messages through the interconnectivity services hub 130 to any other entity. As previously mentioned, the mobile communication device (not shown) can include one or more mobile payment applications which can allow a user to generate and send the electronic communication to the issuer from the mobile communication device.

Referring now to FIG. 2, an exemplary block diagram of an interconnectivity service hub 130 in a mobile contactless payment system according to an exemplary embodiment of the present invention is shown. The system includes a interconnectivity service hub 130, which receives incoming secure communications from various entities, such as an issuer 110(A), an issuer trusted service manager 120, a mobile network operator, secure element trusted service manager 140, a mobile communication device comprising a mobile wallet, payment application, and/or a secure element 181, a mobile gateway 160, and a wallet provider 150. Accordingly, the hub 130 has interfaces or connectors allowing communication between each of the aforementioned entities and the hub 130. The interfaces connect with the issuer trusted service managers, issuers, secure element trusted service managers, mobile, digital or multi-channel mobile wallet providers, and a central trusted service manager.

The hub 130 is composed of four primary modules, similar to those shown in FIG. 1. The four modules include a configurable routing table module 132, a protocol adapter module 133, a key management module 134, and a reports module 136. As described in the definitions section above, the key management module 134 provides secure key storage and an authentication mechanism for the interfaced entities. The reports module 136 may be used by the hub to generate reporting or notification communications to the various interested entities after a request or command has been completed using the hub 130. The configurable routing table module 132 keeps records of the interfaced entities address, their protocols, and any other information that may be used to route communication messages between them. The hub 130 also includes a protocol adapter module 133 which allows the translation of commands between interfaces or connectors using the protocols determined by the routing table module 132. Each interface or connector is supported by interconnection services, each of which follows a protocol. Some examples of protocols and interfaces that may be supported by the hub 130 are described in more detail in reference to FIG. 3 below.

Every incoming connection at the hub 130 is authenticated according to a security policy through an authentication module, which can be integrated with the key management module 134 or be a separate module within the hub (not shown).

After authentication, the hub 130 can determine the protocol of the received communication. The hub 130 can determine the protocol through any suitable manner. For example, the hub 130 may determine the protocol of the communication by determining what protocol is associated with the interface that the entity is sending the communication through, referencing the client identifier in the received message to the routing table to determine what protocol the entity registered during the on-boarding or registration process, by asking the protocol adapter to determine the protocol from a protocol mapping that is stored for that client identifier, or through any other suitable method. Once the protocol is determined, the message may be translated into the protocol and sent to the address determined by the routing table module.

Some embodiments of the protocol adapter module 133 can include a memory element for storing a plurality of protocols known in both the issuer environment and the mobile network environment. These protocols can include various standards by which the trusted service manager communications can be translated within the hub 130. For example, the protocol adapter can support Global Platform™, GSM Association (GSMA™), and Association Française du Sans Contact Mobile (AFSCM™). Additionally, the protocol adapter module 133 can support various mobile contactless payment platforms (e.g., mobile/electronic wallet, ISIS™, etc.).

The routing table module 132 can determine the desired recipient's address and protocol through any suitable method. For example, the routing table module 132 may determine the recipient through an identifier in the communication including either the mobile communication device's mobile subscriber integrated services digital network number ("MSISDN") or phone number, a secure element identifier, an application identifier, customer account reference number, issuer identifier, a destination client identifier, a transaction identifier, wallet provider identifier, or any other identification information that may be included in the message related to the destination of the message. The method of identifying the recipient may change depending on the request and the originator (or requestor) that is sending the message to the hub 130. Either way, once the routing table module 132 identifies the recipient, the routing table may determine the protocol and address of the recipient by looking up the information in the routing table or other database of registration information. The routing table module 132 may also determine the protocol through any other suitable method, such as, for example, asking the recipient in a separate message to identify the requested protocol, if there is a duplicate or other uncertainty surrounding the correct protocol.

Once the hub 130 determines the protocol of the received message and the protocol and address for the desired recipient, the protocol adapter module 133 can then determine if the communication additionally requires authorization (e.g., through the payment processor 133(A) and an associated protocol for the payment processing network). The protocol adapter module 133 may then translate the message to the desired protocol so that the translated message may be sent through the desired interface to the desired recipient. In the example shown in FIG. 2, proprietary protocols 133(B), Global Platform™ protocol 133(C), and a particular country's (country X) protocol 133(D) are shown as part of the protocol adapter module 133.

The hub 130 14 can additionally include a Global Platform™ module 27, which provides GP standards, protocols, languages, etc., for utilizing the mobile communication device at contactless devices in foreign countries. The hub 130 14 can additionally include modules for various protocols and standards for countries offering contactless transaction capability, such as Association Francaise pour le "Sans Contact" Mobile (AFSCM) 28, for example.

The different protocols within the protocol adapter may be used to translate the messages between entities. While FIG. 2, shows some of the entities and how they may communicate with one another, FIG. 3 shows the various interfaces between the hub 130 and the entities and provides further details regarding the functionality of the hub 130 within the mobile contactless payment system.

Referring to FIG. 3, an exemplary block diagram of the system in FIG. 2 is illustrated indicating various protocols utilized to communicate within the system. As shown in FIG. 3, the hub 130 has four modules which execute the protocol adaptation 133, reporting 135, security (key exchange) 134, and routing 132 of the translated messages. The reports module 135, protocol adapter 133, key management module 134, and routing table 132 are described above with reference to FIG. 2 and in the definitions section. As explained previously, the hub 130 can be in communication with various issuers 110(A), 110(B), issuer trusted service manager 120, secure element trusted service manager 140, central trusted service manager 131 (shown separate from the hub 130 in FIG. 3 but could also be incorporated into hub 130 as shown in FIG. 2), a mobile gateway 160, a mobile wallet service provider 150, a payment processing network 170, mobile network operator 192, application personalization preparation service 191, and a mobile communication device 130 comprising a mobile application and a secure element 181 including a proximity payment system environment chip 182 and mobile payment application 183. The numerals for each communication path show exemplary protocols that may be implemented in some embodiments of the present invention.

The application personalization preparation service 191 may include any third party that may generate application personalization information on behalf of the issuer 110(A) or the central trusted service manager 131. The application personalization preparation service 191 may generate all of the application personalization information for a mobile payment application 183 or may generate any portion of the application personalization information on behalf of an issuer 110(A) or issuer trusted service manager 120. The application personalization information may then be forwarded through the hub 130 and used in a provisioning process by the central trusted service manager 131, issuer trusted service manager 120, or a secure element trusted service manager 140.

The various protocols which can be followed through the hub 130 can depend on the issuers 110(A),110(B), mobile network operator (MNOs), mobile communication device secure element 181, mobile wallet provider 150, issuer trusted service manager 120, secure element trusted service manager 140, or the integrated central trusted service manager 131. The protocol could be determined by the entity communicating with the hub 130 (e.g., based on the type of communication protocol the entity already uses) or could be determined based on the type of service being requested by the entity (e.g., end-to-end trusted service manager service by hub 130 may utilize uniform protocol interface for all issuers using that service).

Examples of the various protocols that may be implemented for the various entities are shown in Table 1 below.

TABLE 1

FIG. 3 Protocol Legend

| Protocol | Description |
| --- | --- |
| 1 | Issuer to hub for end-to-end trusted service manager service (comprises a secure element trusted service manager sub-protocol (1a) and a mobile wallet sub-protocol (1b) |
| 2A | ISIS ™ secure element trusted service manager to Interoperability Service Hub |
| 2B | ISIS ™ mobile wallet protocol |
| 3 | Interoperability service hub to issuer trusted service manager |
| 4 | Interoperability service hub to mobile gateway |
| 5 | Interoperability service hub to mobile wallet provider |
| 6 | Global Platform ™ trusted service manager to trusted service manager messaging protocol |
| 7 | AFSCM Protocol |
| 8 | Trusted service manager application protocol |
| 9 | Mobile gateway to mobile application and mobile payment application |

TABLE 1-continued

FIG. 3 Protocol Legend

| Protocol | Description |
| --- | --- |
| 10 | Global Platform ™ (Load and Install) and EMV ™ (Personalize) to secure element |
| 11 | Mobile application guides and EMV ™ specification (for proximity payment secure environment) |
| 12 | Mobile contactless payment specification and mobile application guides |
| 13 | Primary account number (PAN) authorization message protocol for payment processing network |
| 14 | Mobile number verification request to mobile network operator protocol |
| 15 | Mobile payment application personalization application data |
| P | Proprietary protocol (protocol not registered with the interconnectivity service hub) |

A first protocol includes an issuer to interconnectivity service hub end-to-end trusted service manager service protocol (Protocol 1). This protocol is used for issuers 110(A) who are configured to communicate directly with the hub 130 for end-to-end trusted service manager services (i.e., where the central trusted service manager may prepare application data on behalf of the issuer and provide other trusted service manager services on behalf of the issuer). The end-to-end trusted service manager service interface may also be used partially for an issuer using its own trusted service manager but who would like to incorporate some trusted service manager services from the central trusted service manager of the hub 130. In such a protocol, the issuer 110(A) can rely on the hub 130 to perform all the trusted service manager services between a mobile wallet provider 150 and a secure element 181, through the secure element trusted service manager 140 and a mobile gateway application 188 on the mobile communication device 180. This first protocol can communicate directly with a mobile communication device 180 through a mobile gateway 160 associated with the hub 130.

The issuer end-to-end trusted service manager services interface 1 allows an issuer 110(A) to use the trusted service manager services through a set of abstract commands provided by the hub 130. These commands are then translated into commands or requests to the trusted services manager which may run the appropriate business process. Available commands or requests include adding a mobile payment application to a secure element, checking status of a previously requested operation, activating, locking, or unlocking a mobile payment application instance on a secure element of a mobile communication device 180, deleting a provisioned mobile payment application instance in a secure element of a mobile communication device 180, reissuing or replacing a mobile payment application instance in a mobile communication device 180, updating mobile application configuration in a mobile communication device 180, and validating the eligibility of a secure element in a mobile communication device 180 to deploy a mobile payment application.

In another protocol, a secure element owner, such as ISIS™, may implement a propriety protocol that can be utilized by a propriety trusted service manager application 190 on a mobile communication device 180 to communicate with the hub 130, such as in an ISIS™ trusted service manager to interoperability service hub protocol (Protocol 2A). The proprietary trusted service manager application 190 may include any application that is configured to communicate 10 with a secure element 181. The proprietary trusted service manager application may be designed to communicate with the secure element application programming interface as any other typical trusted service manager application 189. The hub 130 can then communicate with an issuer trusted service manager 120, such that a message sent between the issuer trusted service manager 120 and the secure element trusted service manager 130 is processed through the protocol adapter 133 of the interconnectivity service hub 130. If the issuer is using its own trusted service manager 120 only, the interconnection services may be used because the ISIS™ trusted service manager protocol 2A may be the same for both the issuer trusted service manager 2A and the secure element trusted service manager 2A. Accordingly, the message or request may not need to be translated to another protocol and instead, the hub 130 may merely route the message to the correct destination without translating the message. However, if the secure element trusted service manager and the issuer trusted service manager are using different versions of the same protocol 2A, where optional settings are different between the protocols, the protocol adapter may still translate the message according to the protocol mapping for each entity.

Similarly, in a further protocol (not shown), the secure element owner/issuer, such as ISIS, can provide a propriety protocol for a mobile wallet provider 150, such as in an ISIS™ mobile wallet protocol (Protocol 2B). Accordingly, the propriety trusted service manager application on the mobile communication device 180 may be associated with the mobile wallet provider 150, not the secure element issuer (not shown) or secure element trusted service manager 140. Both of these protocols (2A and 2B) may be implemented by the hub 130 at the relevant interface or connection point between trusted service managers 2A and mobile wallet providers 2B that are using the ISIS™ protocols (Protocol 2A and 2B).

In a further protocol, the hub 130 may be utilized as a trusted service manager solution for an associated issuer, using the central trusted service manager protocol (Protocol 3). The interface between the internal hub 130 service's (routing table module 132, protocol adapter, key management module, and reporting module) and the central trusted service manager 131 may follow the internal hub to central trusted service manager protocol (Protocol 3). In some embodiments, the central trusted service manager may be incorporated into the interconnectivity service hub 130 (as shown in FIGS. 1-2) or alternatively, the central trusted service manager may be separate from the hub 130 (as shown in FIG. 3). The internal hub to central trusted service manager protocol 3 may be based on a Global Platform™ protocol, may be proprietary to the hub 130 and central trusted service manager 131, or may be based on any other suitable communication protocol.

In another embodiment, the hub 130 may be utilized to communicate with a mobile gateway 160, such as in the central trusted service manager to mobile gateway protocol (Protocol 4). The trusted service manager to mobile gateway protocol 4 may be based on an existing mobile gateway protocol or any other suitable communication protocol may be implemented. The mobile gateway based protocol 4 may be used by the interconnectivity service hub 130 for any suitable manner to communicate with the mobile gateway or through the mobile gateway. For example, the mobile gateway protocol 4 may be used by the hub 130 to notify a mobile gateway of any state change in a mobile payment application instance or provide the mobile gateway with information regarding the current state of the mobile application in a mobile communication device. Furthermore, because the mobile gateway may comprise issuer keys for completing issuer updates on existing mobile payment applications for that issuer, the central trusted service manager may request a new mobile application identifier (MAID) that may be used to provision a new mobile payment application in a secure element.

The mobile gateway protocol 4 may be used to get a mobile application identifier (MAID) from a mobile gateway as part of the new mobile application deployment process. The central trusted service manager may request the MAID value from the mobile gateway when the central trusted service manager does not have appropriate issuer keys to generate the MAID by itself. The MAID may be used in a request to add a mobile payment application to a secure element. The MAID may be used to generate a unique derived key (UDK) that is used by a mobile gateway to later communicate with the mobile payment application in a secure communication. The central trusted service manager may create a request for a MAID value and send the request to the mobile gateway via the trusted service manager hub. The request for the MAID value may include an issuer transaction identifier and an issuer identifier (e.g., BIN) that identifies the issuer to the mobile gateway, so that the mobile gateway may generate a mobile application identifier for the correct issuer. The mobile gateway may then create the MAID based on the issuer identifier and a master key shared by the issuer using a mobile application identifier algorithm. Any suitable mobile application identifier algorithm may be implemented as long as the mobile application identifier that is generated is unique to the user and/or mobile payment application. The mobile gateway may then send the mobile application identifier to the central trusted service manager in response to the request.

Additionally, the hub 130 may communicate with the mobile gateway when the issuer, mobile wallet provider, or central trusted service manager requests to notify the Mobile Gateway of any state changes that may occur to the Mobile application during the life cycle of the mobile application. Accordingly, a notify state change message may be generated so that the mobile gateway may be notified when an issuer has previously initiated a request to add, lock, unlock, activate, replace, delete, or update a mobile payment application. For example, after a central trusted service manager has received confirmation or a response message corresponding to one of the above requests for an issuer or wallet provider, the central trusted service manager may generate a notification and send the notification to the mobile gateway. The notification may comprise an issuer transaction identifier, a consume account reference identifier, an operation indicator (e.g., add, activate, lock, unlock, upgrade, delete, update, etc.) to inform the mobile gateway of the type of request that was accomplished regarding the mobile payment application, any necessary application identification information, mobile payment application identifier, secure element identifier, mobile communication device identifier (e.g., MSISDN), mobile payment application version and service identifier, and any other relevant information that may allow the mobile gateway to update the information regarding the issuer, mobile payment application, secure element, mobile communication device, consumer, or any other information the mobile gateway may store regarding the mobile payment system.

In another embodiment, the hub 130 may be utilized to communicate with a mobile wallet provider 150 using another protocol (5). The hub 130 may be utilized to communicate with a mobile wallet provider 150, such as to securely communicate between the mobile communication device 180 and mobile wallet provider 150. Additionally, the mobile wallet provider to hub protocol 5 may be used to communicate between a wallet provider and an issuer 110 (A)/110(B) or issuer trusted service manager. For example, using the interface between the mobile wallet provider and the hub 130, the system may allow a consumer to request to add, delete, check the status of previous requests, or perform any other mobile payment application related services from the mobile wallet provider user interface application 187. The mobile wallet provider user interface application 187 may be a separate application provided by a mobile wallet provider or may be a module of a larger mobile application provided by any entity as part of a mobile payment system that may be installed on an unsecured memory of the mobile communication device 180. The mobile wallet provider user interface application may allow a user to interact with a mobile wallet provider to manage and update the mobile payment applications operating or available on the mobile communication device 180. The mobile wallet provider user interface application may communicate with the wallet provider using a proprietary communication protocol but the mobile wallet provider may then communicate any requests or commands through the hub 130 using the mobile wallet provider to hub protocol 5.

In further embodiments, the hub 130 can follow a protocol to communicate between a trusted service manager implementing a Global Platform™ trusted service manager messaging protocol 6 to implement an interconnectivity service hub 130 interface for Global Platform™ trusted service managers 6.

Additionally, in a further embodiment, the hub 130 can follow other foreign communication protocols including, for example, the Association Francaise pour le "Sans Contact" Mobile protocol (Protocol 7) which is utilized in France. The hub 130 can similarly support various other protocols within other foreign countries, which follow specific security guidelines during contactless payment. Trusted service managers may implement any typical requests or commands using these communication protocols as described above regarding the end-to-end trusted service manager services hub interface 1 including the adding, deleting, updating, management, and any other suitable requests that trusted service managers may send in a mobile contactless payment system. However, the trusted service manager tasks that may have been implemented by the central trusted service manager 131 in the end-to-end trusted service manager services protocol 1 may now be completed by the issuer trusted service manager 120 and secure element trusted service manager 140. Accordingly, the application personalization information preparation and message generation may be completed by the issuer 110(B) or issuer trusted service manager 120 and the hub 130 may complete protocol translation and routing of messages to the appropriate secure element trusted service manager 140. The hub 130 may also be involved in data preparation when necessary to accommodate new protocols, entities, or trusted service managers that may not be currently generating all of the application data necessary for the requested action.

In other embodiments, the hub 130 can include a default trusted service manager protocol 8 which may be utilized by the central trusted service manager 131 using over-the-air messages to communicate directly with the trusted service manager application 189 when the protocol associated with a secure element trusted service manager 140 is unspecified or when the central trusted service manager 131 may communicate directly with a secure element 181 through a trusted service manager application 189. This protocol 8 may be utilized when the central trusted service manager 131 is used to prepare, provision, and manage a mobile payment application 183 on a secure element 181 of a mobile communication device 180 directly through a trusted service manager application 189.

Additionally, in a further embodiment, the hub 130 can support communication between an associated mobile gateway 160 and associated mobile applications 186 and mobile payment applications 183 on a mobile communication device 180, such as in the mobile gateway to mobile payment application and mobile application protocol (Protocol 9). The mobile gateway to mobile payment application and mobile application protocol 9 may be used by the hub 130 when the hub 130 may be responsible for performing issuer updates, configuration updates, or any other requests or activities that may be advanced through direct communication with a mobile application 186 through a mobile gateway 160. Any suitable actions may be incorporated to communicate through the mobile gateway 160 with the mobile application 186 and mobile payment application 183 including notifications sent from issuers 110 regarding balances, or any other time an issuer 110 or other entity would like to communicate a secure message to the mobile payment application 183.

The hub 130 can also follow a protocol to process an authorization request 13 through an associated and integrated payment processing platform 170, such as in the primary account number (PAN) authorization request 13 through a payment processing network protocol 170. The hub 130 may use this interface and protocol 13 when an entity requests an action that requires authorization from a payment processing network 170 in order to complete or may use this as part of an authentication procedure to ensure that a PAN or other user information exists or is otherwise authorized to be used.

The hub 130 can further follow internal protocols while communicating between issuer and secure elements in order to more efficiently and effectively complete the request. For example, the hub 130 can follow a protocol 14 to verify a mobile number associated with a mobile wallet or corresponding to a secure element request, such as through a mobile network operator 192 or the mobile wallet provider 150. The hub 130 may send a request in the protocol 14 to a mobile network operator 192 to determine a secure element identifier, a secure element trusted service manager identifier, or any other identifier or information that a mobile network operator 192 may control that may be useful in completing a request.

Additionally, in situations where a mobile communication device 180 does not support payment protocols within a foreign country, the hub 130 can communicate with the mobile communication device 180 to load and install Global Platform™ supported data and protocols in a Global Platform™ and EMV™ protocol 10, which securely communicates through either the associated trusted service manager application 189 or propriety trusted service manager applications 190 on the mobile communication device 180 with the mobile payment application 183.

Finally, protocols may be implemented between the mobile application and proximity payment system environment and mobile application. For example, the mobile application guides and EMV™ specification (for proximity payment secure environment) protocol 11 may be used to communicate between the proximity payment secure environment 182 and the mobile application 186. Additionally, the mobile contactless payment specification and mobile application guides protocol 12 may be used to communicate between the mobile application, mobile payment application, and proximity payment system environment. One of ordinary skill would recognize that any number of protocols may be used to communicate within the mobile communication device applications in order to complete the tasks described herein.

II. Exemplary Methods

Figure 4:
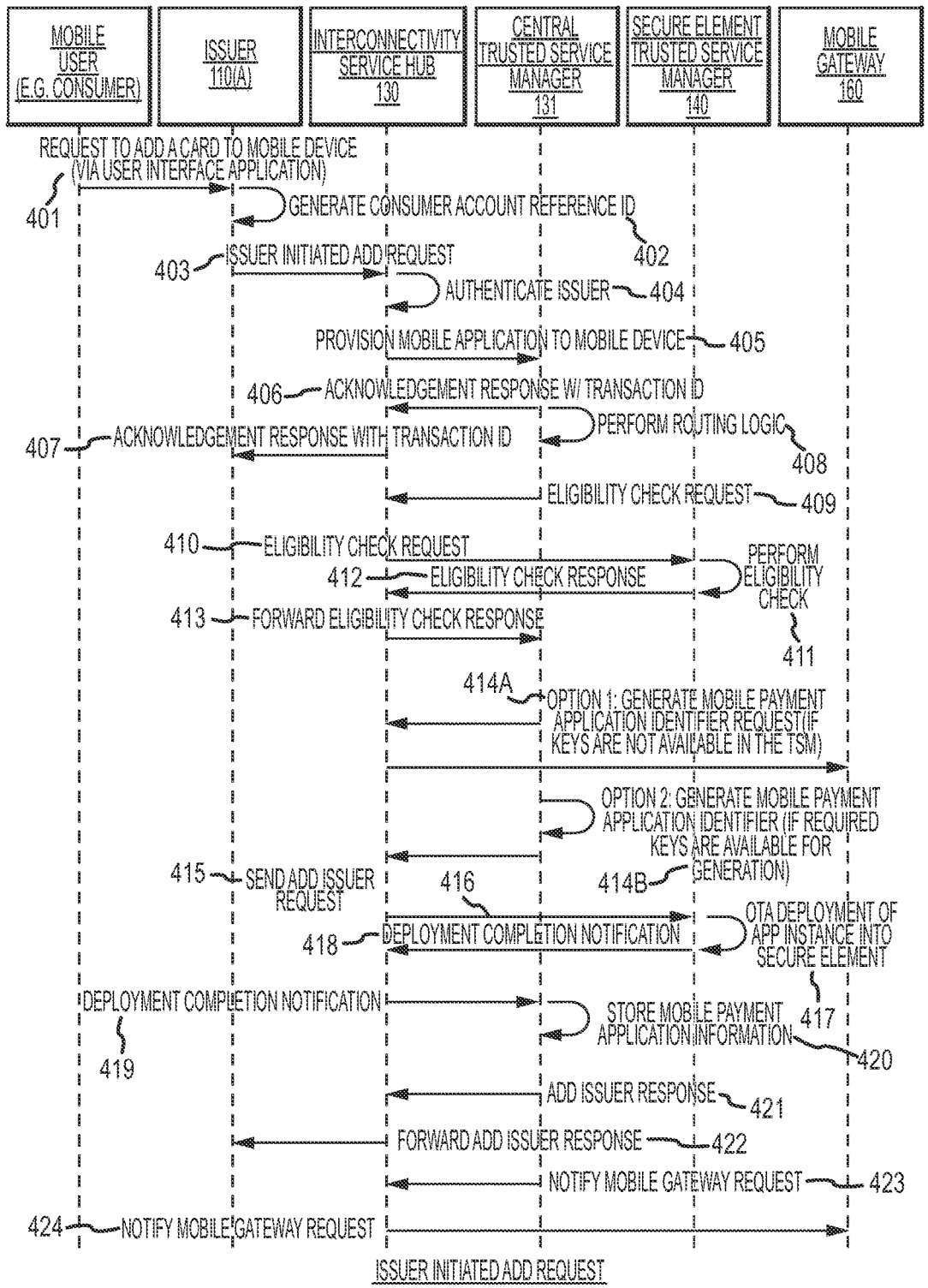
FIG. 4 shows an exemplary process flowchart for an issuer initiated request to add a mobile payment application on a secure element using an end-to-end issuer trusted service manager service request protocol for an issuer that uses the interconnectivity hub for their trusted service manager services, according to an exemplary embodiment of the present invention.
Figure 5:
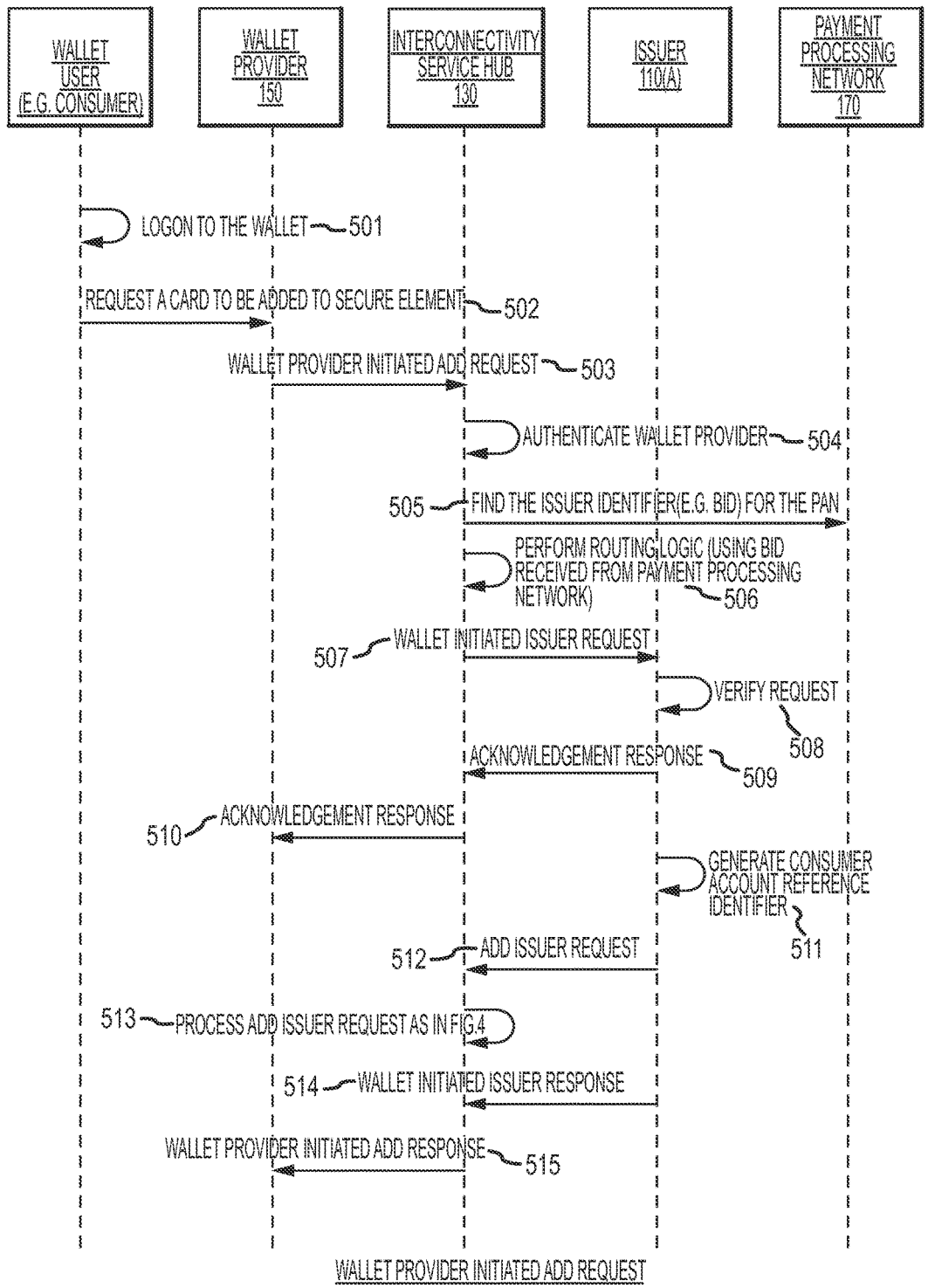
FIG. 5 shows an exemplary process flowchart for a wallet provider initiated request message between the mobile wallet provider and an issuer in order to add a mobile payment application to a mobile communication device through a mobile wallet provider user interface application using the hub, according to an exemplary embodiment of the present invention.

FIGS. 4-5 show exemplary flowcharts of methods for processing a message related to a mobile payment application on a secure element of a mobile communication device 180 through an exemplary interconnectivity services hub 130 as shown in FIG. 3. FIG. 4 shows an exemplary process flowchart for an issuer initiated request to add a mobile payment application on a secure element using an end-to-end trusted service manager issuer services request (protocol 1) for an issuer that uses the interconnectivity hub 130 for their trusted service manager services. FIG. 5 shows an exemplary process flowchart for a wallet provider initiated request message (protocol 5) between the mobile wallet provider and an issuer in order to add a mobile payment application to a mobile communication device 180 through a mobile wallet provider user interface application 187. FIGS. 4-5 are exemplary process flowcharts for communication flows that may be implemented and do not limit the capabilities of the system in any manner. Any other messages may be sent and many other types of requests, messages, protocols, and communication flows may be implemented using the hub.

FIG. 4 shows an exemplary process flowchart for an issuer initiated request to add a mobile payment application on a secure element using an end-to-end issuer services request (protocol 1) for an issuer that uses the interconnectivity hub for their trusted service manager services. In the issuer initiated add mobile payment application request process flow, the issuer sends a command to the hub requesting a new application be provisioned and the hub performs the actions that a trusted service manager typically performs (i.e., the hub provides end-to-end services for the issuer) including communicating with a secure element trusted service manager in order to deploy the mobile payment application on the secure element.

In step 401, a mobile user or consumer may subscribe to a mobile contactless payment service by sending a request to an issuer to add a card to their mobile communication device. For example, the consumer may login to an issuer website and initiate a request to provision their account into their mobile communication device. The mobile contactless payment service may comprise a set of applications (i.e. a mobile payment application and supporting applications) that may be deployed in the consumer's secure element, as well as optionally a set of user interface applications to be deployed in the secure element or the unsecured memory of the mobile communication device. The consumer may provide identification information including account information, mobile communication device identifier (e.g., MSISDN), make and model of mobile communication device, or any other information that is requested by the issuer to initiate a request as described herein.

The request may be sent to the issuer through any suitable manner. For example, an issuer may have an option on their website or other secure area for the user to request a mobile payment application to be installed on their NFC capable mobile communication device. As such, issuers may use account and personal information already known about a consumer without requiring the consumer to enter all of their information in order to initiate a provisioning request.

In step 402, the issuer receives the request from the consumer to add an account. The issuer may request any additional information that is necessary in order to process the request including any customer service, billing, or other services surrounding the account and then may generate a consumer account reference identifier to be used with the mobile payment application. The issuer may associate the consumer account reference identifier with the consumer's account identifier (e.g., consumer primary account number (PAN)) and the mobile payment application such that the consumer account reference identifier may be used as a reference identifier for the mobile payment application for the life of the PAN or the mobile payment application. Any suitable consumer account reference identifier may be implemented by an issuer including an alphanumeric indicator or any other suitable indicator.

In step 403, the issuer may create an add mobile payment application issuer request and send the request to the interconnectivity service hub. The add mobile payment application issuer request may comprise any information to be used in processing the request. For example, the request may include a client identifier (assigned by the hub to the issuer), issuer information including an issuer transaction identifier (may include a time stamp and unique identifier for the transaction), payment processing network issuer identifier (e.g., bank identification number (BIN)), and/or hub issuer identifier (e.g., bank identifier (BID)) which may be assigned to the issuer by the hub during the registration or "on-boarding" process.

Additionally the add mobile payment application issuer request may comprise the customer account reference identifier which is associated with the consumer's PAN, a service identifier including an issuer product identifier, secure element issuer identifier, or service version to identify the secure element owner and corresponding secure element trusted service manager. Furthermore, the request may comprise a mobile communication device identifier (e.g., a MSISDN) to identify a mobile subscription with a mobile network operator and corresponding mobile communication device.

The request may further comprise application personalization information. The application personalization information may include encrypted binary data or a cross-reference to a pre-provisioned version of application personalization information or an indicator of where to find the pre-provisioned data. For example, some issuers may pre-provision application personalization information in a batch file that includes all the application personalization information and send the batch file to issuer trusted service manager (or central trusted service manager) before a request to provision an account is ever received. In that manner, the trusted service manager may have access to the necessary application personalization information to provision the data when a request comes to the issuer trusted service manager and the issuer may not have to prepare such data when the request is received. Accordingly, the issuer trusted service manager or central trusted service manager may have access to pre-provisioned information to allow it to immediately provision the account when the provisioning request is received. Further, the request may comprise mobile application identification information (e.g., a MAID value) that uniquely identifies the mobile payment application to the issuer. Additionally, if the mobile payment application, issuer, or consumer account is associated with a mobile wallet provider, the request may include a wallet request identifier, wallet provider identifier, and/or wallet provider transaction identifier.

In step 404, the hub may authenticate the issuer using any suitable method. For example, the issuer request may comprise a username and password or the request may be encrypted using a key associated with the client identifier assigned to the issuer during registration. The key management module may determine the entity sending the request using a client identifier in the message or using an interface identifier, and may use a stored key associated with the issuer to decrypt the request. Any other suitable authentication procedure may be implemented including challenge response messages, other mutual authentication techniques, or any other suitable authentication procedure.

In step 405, the hub may log the request received from the issuer and may forward the add mobile payment application request message to a central trusted service manager associated with the hub. The central trusted service manager may be integrated into the hub (as shown in FIGS. 1-2) or may be separate (as shown in FIG. 3). Either way, the functionality of the central trusted service manager may be accomplished in the same manner. In some embodiments, the hub may translate the issuer request to the central trusted service manager protocol so that the central trusted service manager may generate and provision a mobile payment application directly. In some embodiments, the hub may generate or forward a request to the central trusted service manager to provision or add a mobile payment application to the mobile communication device via the secure element trusted service manager. The provision mobile payment application request may include all of the relevant data necessary for the central trusted service manager to generate a request that a secure element trusted service manager provision a new mobile payment application in a secure element, as will be described in further detail below.

In step 406, the central trusted service manager may validate the fields of the request to ensure all of the necessary information is present. In order to validate the request, the central trusted service manager may determine whether the request comprises all of the requisite encrypted application personalization information. In some embodiments, the application personalization information may comprise a reference to pre-provisioned personalization information stored at the hub for the issuer or may reference an entity that may be contacted in order to perform the application personalization preparation. In such embodiments, the central trusted service manager may determine a reference to the pre-provisioned personalization information and may use the reference to pull the application personalization information from a pre-provision file or request the application personalization information from an application personalization preparation service 191. The central trusted service manager may also attempt to validate any other field of the request including looking a mobile network operator associated with the mobile communication device, investigating the account associated with the request, or completing any other suitable validation of the request message. If the central trusted service manager cannot validate the request for any reason, an error message may be sent to the hub for forwarding to the issuer.

However, if the request is validated, the central trusted service manager may create an acknowledgement response message and send the acknowledgement to the hub. The acknowledgement message may inform the hub that the request was validated and the central trusted service manager has begun to complete the request. The acknowledgement message may comprise any identification information that may allow the hub or issuer to identify which request is being acknowledge and allow the hub or issuer to later check the status of the request (e.g., a transaction identifier, request identifier, etc.).

In step 407, the hub may forward the acknowledgement response message to the issuer with the transaction identifier such that the issuer may track the status of the request.

In step 408, the central trusted service manager or the hub may determine the destination address of the issuer trusted service manager and/or secure element trusted service manager using the routing table module. The routing table module may determine the destination entity using information from the request provided by the issuer or may send a request to other entities to determine any necessary information (e.g., a request may be sent to a mobile network operator 192 to look up the secure element information associated with the mobile communication device). The routing table module may then provide the address to the central trusted service manager or may associate with destination with the central trusted service manager request such that the hub may forward any communication related to the request to the destination secure element trusted service manager. Although FIG. 4 shows this step occurring at the central trusted service manager, the routing table module may be used by either the hub or the central trusted service manager to determine the appropriate destination address and protocol.

In step 409, once the destination address is determined, the central trusted service manager may generate an eligibility check request to be sent to the destination secure element trusted service manager to determine whether the mobile communication device is eligible for provisioning a mobile payment application thereon.

Accordingly, before requesting the deployment of the mobile application in the consumer's secure element, the central trusted service manager may first verify the consumer mobile communication device's environment compliancy (both mobile communication device and the secure element) with NFC requirements for the issuer (e.g. verify that the secure element is NFC capable), over-the-air communication requirements (e.g. verify that the secure element is reachable through over-the-air communications), and specific mobile-NFC service deployment requirements for the mobile payment application (e.g., verify there is sufficient free memory in the secure element). In embodiments of the present invention, these checks may be performed directly by the issuer, issuer trusted service manager, central trusted service manager, or through collaboration with the secure element owner or secure element trusted service manager.

The eligibility request sent from the central trusted service manager may include a client Identifier, issuer data (e.g. unique transaction identifier, a payment processing issuer identifier (BIN), a hub issuer identifier (BID), a service identifier that identifies the secure element owner or secure element trusted service manager, and a mobile data identifier (e.g., MSISDN) to identify a mobile subscription where the secure element is located. Any other information may be included in the message and less information may be included in some embodiments as well.

In step 410, the hub may receive the eligibility request, may identify the destination address and destination protocol using the routing table module or using information in the request from the previously determined address by the routing table module, may translate the protocol of the message to that of the destination secure element trusted service manager (or other entity) using the protocol adapter module, and may forward the eligibility request to the destination secure element trusted service manager that is capable of communicating with the secure element or secure element owner.

In step 411, the secure element trusted service manager may complete the eligibility check by communicating with the secure element, secure element owner, mobile network operator, or mobile communication device to ensure the secure element is NFC capable, the secure element is over-the-air reachable, and the secure element has sufficient free memory to accommodate the mobile payment application.

In step 412, the secure element trusted service manager may generate an eligibility check response message and may send the eligibility check message to the hub. The eligibility check response may comprise an indication as to whether the secure element and mobile communication device are eligible for the mobile payment application.

In step 413, the hub receives the eligibility check response, translates the protocol to match that of the central trusted service manager, and forwards the eligibility check response to the central trusted service manager. Depending on the protocol used to communicate with the secure element trusted service manager, the hub may use the protocol adapter module to translate the eligibility response to a central trusted service manager protocol 3 that the central trusted service manager may understand. The translation may occur through any suitable method as is described in the various embodiments of the present invention including a protocol mapping according to the secure element protocol mapping, a central trusted service manager protocol mapping, an orchestration engine generating multiple possible response messages, or through any other suitable method for implementing translation between multiple communication protocols.

After verifying that a mobile payment application may be provisioned on the secure element corresponding to the requesting consumer's mobile communication device, the central trusted service manager may determine the set of individual over-the-air operations that may be performed for delivering the mobile payment application and any other necessary applications (e.g., mobile application and various module applications). Each individual over-the-air operation is then performed by the central trusted service manager directly with the secure element or is sent to a secure element trusted service manager through the hub to be completed by the secure element trusted service manager. For example, the provisioning may occur directly with the secure element (e.g., through a trusted service manager application 169 on the mobile communication device 180) if the central trusted service manager has received a secure element key corresponding to a security domain created for the issuer on the secure element through the hub. The secure element key may be provided by the secure element trusted service manager in alternative process flows where instead of provisioning the mobile payment application, the secure element trusted service manager generates a security domain and then sends the information to the issuer trusted service manager or central trusted service manager to complete the provisioning of the mobile payment application on the secure element using the secure element key.

In step 414A, in order for the central trusted service manager to generate the requisite provisioning data to personalize the mobile payment application, a mobile payment application identifier (MAID) may be generated to uniquely identify the mobile payment application as being tied to a particular consumer during later payment transactions. Accordingly, the central trusted service manager may use an algorithm to generate the MAID value. However, the central trusted service manager may only generate the MAID if the central trusted service manager has access to the issuer master key that may be used to personalize mobile payment applications. Accordingly, if the central trusted service manager does not have access to an issuer's master key for personalizing mobile payment applications, a unique derived key (UDK) that has been prepared by an application personalization preparation service for the mobile payment application, or otherwise has access to the personalization key that will be used for the mobile payment application, then the central trusted service manager may generate a request for a personalized mobile payment application identifier that uniquely identifies the mobile payment application and therefore, the consumer account associated with the mobile payment application from the mobile gateway. This request may also be sent to an application personalization preparation service that has access to the issuer's master key.

The mobile payment application identifier may be generated by the mobile gateway in response to the request for the mobile payment application identifier using the access to the issuer's master personalization key, and the mobile gateway may return the generated mobile payment application identifier to the central trusted service manager. The hub may receive the request for the mobile gateway to generate the mobile payment application identifier (MAID), may translate the request to the mobile gateway protocol using the protocol adapter, and may send the request to the mobile gateway. The mobile gateway may generate the mobile payment application identifier and may return the mobile payment application identifier through a response sent through the hub.

Alternatively, in step 414B, if the central trusted service manager or the hub has access to the issuer's master personalization key, the central trusted service manager may generate the mobile payment application identifier using the issuer personalization key. For example, in one embodiment, the mobile payment application identifier (MAID) may be based on an algorithm comprising a master key identifier, a UDK identifier, an issuer identifier, and a payment device identifier. The issuer identifier and payment device identifier may be unique to any particular account (similar to a consumer's BIN and PAN combination). The algorithm may be different depending on the issuer, payment system architecture, etc. and the present invention is not limited to any particular algorithm or any particular method of generating a mobile payment application identifier.

In step 415, the central trusted service manager may complete any further provisioning data preparation and may perform the deployment of the mobile payment application on the secure element. The central trusted service manager may complete the deployment by sending a provisioning request for the mobile payment application to the secure element trusted service manager through the hub. The central trusted service manager may generate as many separate messages to complete the deployment as necessary, depending on the protocol of the secure element trusted service manager. The central trusted service manager may determine the deployment messaging requirements from the routing table module providing information regarding the secure element trusted service module requirements or through response messages requesting additional information from the secure element trusted service manager during the deployment. As such, depending on the secure element trusted service manager, the central trusted service manager may create one or more calls or requests related to the provisioning request (e.g. one call for personalization, one for deployment, one for activation, etc.).

In step 416, the hub receives the add request from the central trusted service manager and forwards the add request to the appropriate secure element trusted service manager. The hub may already know the destination secure element trusted service manager based on the previous eligibility request and response or may determine the address for the secure element trusted service manager using the routing table module again. The hub may further translate the request using the protocol adapter module, based on the protocol mapping associated with the secure element trusted service manager, as may be determined by the routing table module. Additionally, in some embodiments, an orchestration engine may generate a number of different add request messages for a number of different secure element trusted service manager requests and then may select the appropriate request for the secure element trusted service manager, without using a mapping protocol. Accordingly, any suitable method for translating the request to the correct protocol to communicate with the secure element trusted service manager may be implemented. The hub may then forward the translated message including the request to the secure element trusted service manager associated with the secure element of the mobile communication device.

In step 417, the secure element trusted service manager may perform the add functions by communicating with the secure element through either a proprietary trusted service manager application or a trusted service manager application that may be integrated into a mobile application. The trusted service manager application may then communicate with the secure element and provision, install, or configure the mobile payment application on the appropriate secure area of the secure element.

In step 418, the secure element trusted service manager may create and send an add response message to the hub that indicates the status of the provisioning request (success or failure), and in some embodiments, may include a request for additional information from the central trusted service manager. The add response may include any and all mobile payment application identification information that may be used in the future to access the mobile payment application, the secure element, or the mobile communication device for any purpose.

In step 419, the hub translates the add response message as described previously in reference to the eligibility response message, and forwards the message to the central trusted service manager.

In step 420, the central trusted service manager may receive the add response message and may store the mobile payment application identification information including the mobile payment application identifier and any other identification information related to the mobile payment application, secure element, and/or mobile communication device. The stored information may include a client identifier, mobile payment application identifier, long application identifier, short application identifier, secure element identifier, service identifier and version, MSISDN, mechanical equipment identifier, hub issuer identifier, customer account reference identifier, secure element profile identifier, and mechanical equipment profile identifier. This information may be stored in a routing table such that the routing table module may have access to this identification information for all related requests in the future. Additionally, the central trusted service manager may store this information for future service requests related to this account, consumer, secure element, or any other related entity.

In step 421, the central trusted service manager generates an issuer add mobile payment application response message and sends the message to the hub for forwarding to the issuer. The issuer add mobile payment application response message may comprise any and all of the above information so that the issuer may update their records so that the mobile payment application may operate correctly.

In step 422, the hub may forward the add mobile payment application response to the requesting issuer.

In step 423, the central trusted service manager may generate and send a notify mobile gateway message including the relevant mobile payment application information in order to notify the provisioning of the mobile payment application to the mobile gateway. Accordingly, the mobile gateway may use the information in the state notification message to communicate with the mobile payment application in order to complete issuer updates, direct communication with the mobile payment application, or complete other requests or services in the future.

In step 424, the hub may receive the notify mobile gateway message, translate the message to the appropriate mobile gateway protocol, log the response (and information therein if not already stored), and may forward the response to the mobile gateway.

Accordingly, the consumer's subscription request initiated at the issuer may be completed using a single connection point between the issuer, secure element, and mobile gateway without requiring any of the entities to adopt or integrate other entity's protocols and while gaining access to a wide-breadth of issuers, secure element trusted service managers, and mobile communication devices.

Other Exemplary Issuer Requests

Other exemplary issuer generated requests include a set application request, a service activation request, a service lock request, a service unlock request, an account deletion or application removal request, an application upgrade request, mobile application data request, update data request, and update notification to wallet provider request. Each request or command may be accomplished through a similar process to that above or may be accomplished using additional or fewer steps.

A set application status request may be used by an issuer to activate an already deployed mobile application or to lock the mobile application in a secure element or to unlock the mobile application in the secure element.

A service activation request may be used to activate a mobile payment application once the mobile payment application has been deployed or installed on a secure element. In some embodiments, issuers or wallet providers may include the provisioning or installation of a mobile payment application and the activation of the mobile payment application in separate steps. Accordingly, following the deployment of the mobile payment application, the secure element owner, wallet provider, or issuer may require an explicit activation operation. However, in some embodiments the activation may be completed as part of the provisioning or deployment process.

A service lock request may be used to lock a mobile payment application from use after it has been provisioned and activated. There are multiple reasons why the mobile payment application in a secure element may need to be locked. For example, the issuer may want to lock the user from using service temporarily because of billing issues or the consumer may want the application to be locked because they want to loan the phone to someone else for a temporary period of time. When a mobile payment application is locked, the mobile payment applications are still present in the secure element of the mobile communication device, but the mobile payment applications for the contactless service may be in a locked state that prevents them from usage with the proximity payment system environment 182.

Similarly, the service unlock request may be used to unlock a mobile payment application after it has been locked. Again, there may be multiple reasons why the mobile payment application in the secure element may need to be unlocked. For example, at the end of the billing problem with the issuer, after receiving the device which was previously loaned, etc. After the mobile payment application is unlocked, the consumer may be able to reuse the mobile payment application using the proximity payment system environment 182.

Additionally, a mobile payment application deletion or removal request may be used to delete the provisioned, deployed, or installed mobile payment application from a secure element. The mobile payment application deletion or removal request may be triggered by a consumer that decides to unsubscribe to the contactless payment environment, wallet, or mobile application, or by an issuer that terminates the consumer subscription for service reasons (e.g., bills not paid.). The issuer or the consumer (through the issuer) may ask the central trusted service manager for the deletion of the service. The trusted service manager may request the deletion using the application identifier, consumer identifier, or any other identification information in order for the secure element trusted service manager to identify the correct secure element to communicate with to delete the mobile payment application from the secure element. The issuer may also receive a request from a wallet provider to delete a mobile payment application instance.

An account upgrade request may be used because during the life of a mobile payment application, several versions may be issued by an issuer in order to enhance the service features, fix a security problem, etc. The issuer may delegate the over-the-air upgrade operation of the mobile payment application to its trusted service manager. The trusted service manager may determine the set of individual OTA operations to be performed for upgrading and replacing the mobile payment application. The trusted service manager may need to perform number of steps to perform the replace operation including (1) locking the mobile payment application to prevent usage of the mobile payment application during the upgrade, (2) deleting the existing mobile payment application, (3) provisioning or initiating a new payment application, new mobile payment application personalization, and new mobile payment application activation, and (4) mobile payment application locking or unlocking, in order to keep the status (locked or not) that the mobile payment application had before the upgrade.

A mobile application configuration request may be used if the issuer needs to update the wallet app widget or perform some other service or presentation based settings to the mobile application configuration. For example, to put some new advertisement on the application or to change the image displayed on the application.

An update data request may be used to update some particular data stored in the mobile payment application. For example, an issuer update may include updating a balance value, ticket information, a mobile payment application's validity period, a mobile payment application's security counters and information, etc.

A notify update to wallet provider request may be used if the issuer needs to notify a wallet provider that some data changed in the profile of the cardholder that may concern the wallet provider. Accordingly, the issuer may send a message to the hub to be routed to the wallet provider. For example, the cardholder may update some information directly or an issuer may update the version of some information on their own, as explained in FIG. 4 above. The hub may find the wallet provider using a wallet provider identifier that may be provided in the request or through the routing table module using a destination address (e.g., a URL) for the wallet provider.

Mobile Wallet Provider Initiated Requests

FIG. 5 shows an exemplary process flowchart for a wallet provider initiated request message between the mobile wallet provider and an issuer in order to add a mobile payment application to a mobile communication device 180 through a mobile wallet provider user interface application. In some embodiments of the present invention, a mobile wallet provider may use a mobile wallet protocol 5 to initiate and request trusted service manager services through abstract commands to the interconnectivity services hub. These requests or commands may then be translated into trusted service manager requests by the hub and routed to the appropriate entities to process the requests and complete the appropriate business processes.

Requests that may be implemented include allowing a wallet provider to request an issuer to deploy an application to a secure element of a mobile communication device, check a status of a previously requested operation, request an issuer to activate, lock, or unlock a mobile payment application deployed on a mobile communication device, request an issuer to delete a mobile payment application, request consumer information and mobile payment application information for a consumer from an issuer, and allow a wallet to send an acknowledgement or status update of requested operations, as well as any other suitable requests that may be implemented related to a mobile payment application on a secure element.

FIG. 5 shows the steps needed to deploy a mobile payment application in a secure element when a consumer initiates a request to deploy the mobile application from the mobile wallet, according to an exemplary embodiment of the present invention. In order to allow a mobile wallet provider to request the provisioning of the mobile payment application, the consumer may have to possess a compatible mobile communication device, a wallet account with cards already active on the account through the mobile wallet provider, the mobile wallet provider may be registered and compatible to participate with the interconnectivity services hub, the consumer may possess an account with an account issuer that is participating in a contactless payment system supporting proximity payments, and the wallet provider and issuer may have completed the registration or "on-boarding" process with the interconnectivity services hub.

The process flow shown in FIG. 5 may be used for a number of separate request from the wallet provider and the hub may need to translate each of the requests from the mobile wallet provider protocol 5 to the issuer end-to-end services protocol 1. Although FIG. 5 shows an add mobile payment application request initiated by a wallet provider, similar requests and processes may be implemented for the hub to receive requests regarding setting a status of a mobile payment application and deleting a mobile payment application initiated by a mobile wallet provider.

In step 501, a consumer may log into a mobile wallet using their mobile communication device or using another device. The consumer may provide secure information to securely log into a website or secure access area such that the consumer may identify themselves to the wallet provider. Furthermore, if the consumer does not previously have a mobile wallet account with the mobile wallet provider, the consumer may provider personal and account information to the wallet provider such that the wallet provider may identify an issuer and an account at the issuer that is associated with the consumer, the consumer's mobile communication device, and any other contact or financial information necessary to initiate a mobile payment application.

In step 502, the consumer requests to add a card from the mobile wallet provider account and to add the card from the mobile wallet provider account to their mobile communication device.

In step 503, The wallet provider may generate an add mobile payment application wallet provider initiated request and send the request to the hub. The add mobile payment application wallet provider initiated request may comprise information regarding the consumer and may comprise a key that may be used to authenticate the communication.

In step 504, the hub may perform the Authentication of the request received from wallet provider and once authenticated may continue with the process.

In step 505, the hub may determine an issuer associated with the request from the wallet provider. The hub may determine an issuer associated with the request through any suitable method including using the routing table to determine an issuer associated with a consumer identifier (e.g., PAN), secure element identifier, or any other identifier included in the request from the wallet provider.

If the hub does not have any information regarding the identity of the issuer other than the consumer's account identifier (e.g., PAN), or does not recognize the customer identifier as being tied to an issuer, the hub may send a request to a payment processing network to identify the issuer of the requested account using the consumer account identifier (e.g., PAN) corresponding to the account associated with the mobile payment application request. The payment processing network may determine a bank identifier (e.g., BIN) associated with the PAN and may return the BIN in a response message. The routing table module may update the routing table with the issuer identifier (e.g., BIN) and may determine a hub issuer identifier (e.g., BID) if the hub issuer identifier (BID) is different than the payment processor issuer identifier (BIN). The routing table module may be updated to create and store an association between the wallet provider, the consumer information (e.g., PAN), the mobile payment application, and the secure element identifier or other mobile communication device information for future reference.

In step 506, the hub may use the routing table module to determine an address and protocol for the issuer that corresponds to the payment processing issuer identifier (BIN) and/or hub issuer identifier (BID) in the routing table. This information may be received during the on-boarding or registration process of the issuer with the hub.

In step 507, once the hub determines the appropriate issuer address and protocol, the hub may generate and send a message informing the issuer of the wallet provider add mobile payment application issuer request. Accordingly, the hub may generate a wallet initiated issuer request message indicating the wallet provider as requesting that the issuer add or provision a new mobile payment application on a secure element of a consumer's mobile communication device.

The wallet initiated issuer request may include any information that may be needed in order to send the request to an issuer, identify the consumer, identify the service requested, and provide prepared data for completing the request. For example, a wallet initiated add mobile payment application request may include wallet data (e.g., wallet provider identifier, wallet transaction identifier), mobile data including mobile communication device identification information (e.g., MSISDN information, mobile network operator identifier, etc.), card data including, for example, a consumer account reference number, PAN, CVV, CVV2, card expiration information, card holder information (e.g. name, address, zip, etc.), a service identifier including an identifier for the secure element trusted service manager, and a request type including information to identify the nature of the request (e.g., add, activate, lock, unlock, delete, etc.), or any other action that a wallet provider may allow a consumer to initiate from the mobile wallet provider user interface application 187. The requests may correspond to the issuer initiated requests explained previously regarding FIG. 4 above. However, the wallet provider may allow consumers to initiate the requests directly from the mobile communication device instead of through an issuer interface or website.

In step 508, the issuer may verify the add mobile payment application request initiated by the wallet provider and may determine whether the consumer should be allowed to have a mobile payment application added to the secure element. If the issuer verifies the request and determines the consumer may provision a mobile payment application using the wallet provider, the issuer may send an acknowledgement of the request to the hub (step 509).

In step 510, the hub may forward the acknowledgement response message to the wallet provider including information that the wallet provider may use to identify the request and track the status of the request in the future.

In step 511, the issuer may generate a consumer account reference identifier that may be used to uniquely identify the mobile payment application as being associated with the consumer.

In step 512, an add issuer request message is generated by the issuer. This may be the same request message as was generated and explained in FIG. 4. Accordingly, at this point, the process flowchart may perform the same steps as FIG. 4 in order to provision the new mobile payment application on the consumer's mobile payment application (step 513). The steps for performing the processing of the issuer initiated add request may be found in FIG. 4 above.

In step 514, the issuer initiated add mobile payment application request process completes and the hub may receive a wallet initiated issuer add response message from the issuer indicating whether the process was successful and providing the relevant information to the new mobile payment application. The hub may log this information for future reference.

In step 515, the hub may generate a wallet provider initiated add response message and send the response to the wallet provider. The response message may comprise the mobile payment application information or any other information that is relevant to the type or request initiated by the wallet provider so that the wallet provider may update their records, and the wallet configuration and settings accordingly.

Accordingly, the consumer's subscription request may be initiated at a mobile wallet provider and may be completed using a single connection point between the mobile wallet provider, issuer, secure element, and payment processing network without requiring any of the entities to adopt or integrate other entity's protocols and while gaining access to a wide-breadth of wallet providers, issuers, secure element trusted service managers, and mobile communication devices.

Additionally, as explained previously, the above exemplary methods may be implemented to complete a broad array of service requests. For example, a wallet provider may perform a number of other services including retrieving the consumer information from an issuer to update configuration of a mobile application on a mobile communication device. Similar processes including communication between wallet providers, issuers, secure element trusted service managers, and any other entities may also be implemented as necessary to complete any actions related to a mobile payment application or mobile contactless payment service.

III. Technical Advantages

The interconnection service hub provides a number of technical advantages depending on the role that the interconnectivity service hub is performing. For example, the interconnectivity service hub may play at least four distinct roles including i) a central point of communication between a large variety and number of different entities, ii) a point to point authentication service between those entities, iii) a protocol translator between connectors (e.g., communication points between various entities communicating with the hub) to simplify the integration and aggregation of multiple entities, and iv) protocol adaptation of the communications between those entities and the hub to simplify service requests, interoperability, and more efficient management of mobile contactless payment systems.

Using the hub, issuers and service providers have a standardized, easy to use, cost-effective and secure method to transfer and install a mobile payment application, on demand, in real time, onto near-field communication (NFC) enabled mobile communication devices. Secure element trusted service managers (e.g., mobile network operators or device platform providers) benefit from having access to an aggregated pool of issuers. Issuers gain access to numerous secure element owners to provision mobile payment accounts for mobile transactions. Accordingly, the hub reduces the business, technical, and operational hurdles associated with establishing relationships between the myriad diverse stakeholders in the mobile payment system. Additionally, the hub provides trusted service manager interconnectivity, end-to-end application services, and mobile wallet platform provider services to entities within the mobile contactless payment system.

Mobile communication device ecosystem includes mobile network operators, mobile communication device manufacturers (OEM/MDM), and mobile wallet providers. As the space grows and more entities are providing services and equipment, the complexity of interconnecting the various parties is increased exponentially. Accordingly, the hub solves the many-to-many interconnection problem by aggregating trusted service manager and issuer relationships and providing issuers access and connectivity to all available mobile communication device ecosystems, without requiring costly, time intensive, and expensive individual connection, negotiation, and implementation.

Additionally, the hub provides end-to-end application services including providing value-added service to provision, distribute, and manage secure applications, mobile applications, and wallets. As such, the hub may provide application data preparation based on a received request from an issuer or other entity. Furthermore, in some embodiments of the present invention, the hub may implement uniform interfaces for issuers that comprise a uniform set of abstract messages that may be used to generate commands or requests that may be recognized by the hub as comprising or relaying particular information. The hub may then generate the particular application data, keys, etc. that are required to complete the request based on the requirements of the second protocol mapping associated with the secure element trusted service manager. Accordingly, the hub may ease the technical integration for issuers and service providers by connecting the issuers and service providers to a variety of secure element owners and mobile communication devices, and may act on behalf of the issuers to complete mobile payment application provisioning and management, as well as other services related to the mobile contactless payment system.

Furthermore, in some embodiments, the hub may orchestrate the correct translation to a destination entity (e.g., secure element trusted service manager) through trial and error with multiple messages based on possible secure element trusted service manager requirements. In this manner, the integration of new secure element trusted service managers is simplified as a protocol mapping is not required and any type of secure element trusted service manager may be implemented without large integration and overhead costs. Accordingly, the hub may dynamically support a range of secure element trusted service management requirements so that integration of secure element trusted service managers is simplified. As such, a custom connection or interface between each secure element trusted service manager is no longer required and a single interface may implement all secure element trusted service managers.

Finally, the hub provides advantages to mobile wallet providers by aggregating device platforms, secure element owners, issuers, and other distribution partners through a single connection point. Accordingly, the advantages discussed above are provided to mobile wallet providers as well.

IV. Exemplary Computer System

Figure 6:
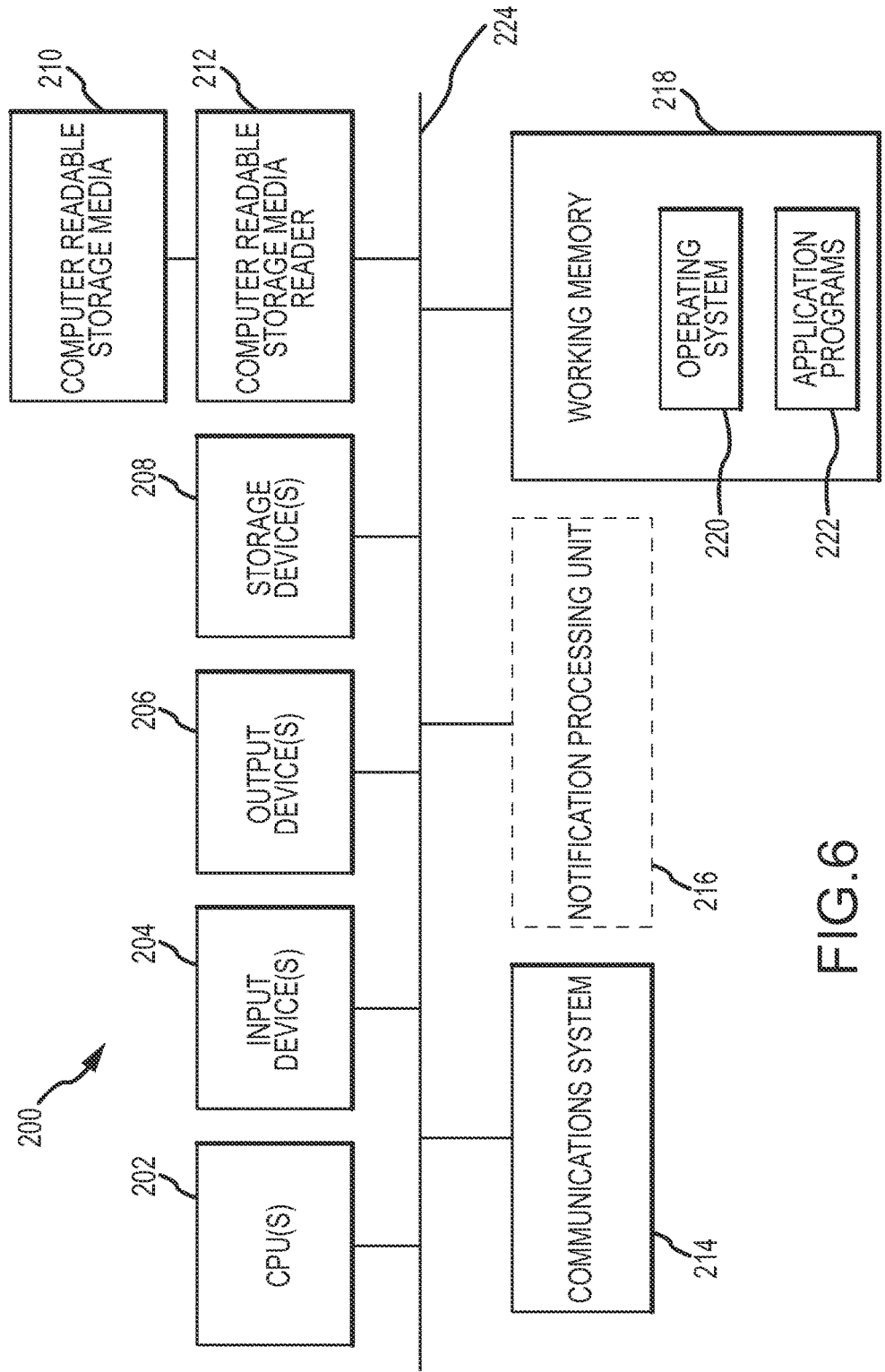
FIG. 6 illustrates an exemplary computer apparatus for use with the system of FIG. 1.

Referring now to FIG. 6, an exemplary computer system 200 according to one embodiment of the present invention is illustrated. The exemplary computer system 200 can be utilized to implement the hub 14 of FIG. 1 among various other embodiments of the present invention may be implemented. The system 200 may be used to implement any of the computer systems described above (e.g., client computer, a server computer at the card association, a server computer at the issuer, a computer apparatus at the merchant, etc.). The computer system 200 is shown comprising hardware elements that may be electrically coupled via a bus 224. The hardware elements may include one or more central processing units (CPUs) 202, one or more input devices 204 (e.g., a mouse, a keyboard, etc.), and one or more output devices 206 (e.g., a display device, a printer, etc.). The computer system 200 may also include one or more storage devices 208. By way of example, the storage device(s) 208 can include devices such as disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 212, a communications system 214 and working memory 218, which may include RAM and ROM devices as described above. The communications systems can include, for example, a modem, a network card (wireless or wired), an infra-red communication device, etc. In some embodiments, the computer system 200 can also include a processing acceleration unit 216, such as a digital signal processor (DSP), a special-purpose processor, and/or the like.

The computer-readable storage media reader 212 can further be connected to a computer-readable storage medium 210, together (and, optionally, in combination with storage device(s) 208) comprehensively representing remote, local, fixed, and/or removable storage devices plus storage media for temporarily and/or more permanently containing, storing, transmitting, and retrieving computer-readable information. The communications system 214 can permit data to be exchanged with the network and/or any other computer described above with respect to the system 200.

The computer system 200 may also comprise software elements, shown to be located within a working memory 218, including an operating system 220 and/or application programs 222 comprising code, such as a client application, Web browser, mid-tier application, RDBMS, etc. It may be appreciated that alternate embodiments of a computer system 200 can have numerous variations from that described above. For example, customized hardware might also be used and/or particular elements might be implemented in hardware, software (including portable software, such as applets), or both. Further, connection to other computing devices such as network input/output devices may be employed.

Storage media and computer-readable media for containing code, or portions of code, can include any appropriate media known or used in the art, including storage media and communication media, such as but not limited to volatile and non-volatile, removable and non-removable media implemented in any method or technology for storage and/or transmission of information such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art may appreciate other ways and/or methods to implement the various embodiments.

Figure 7:
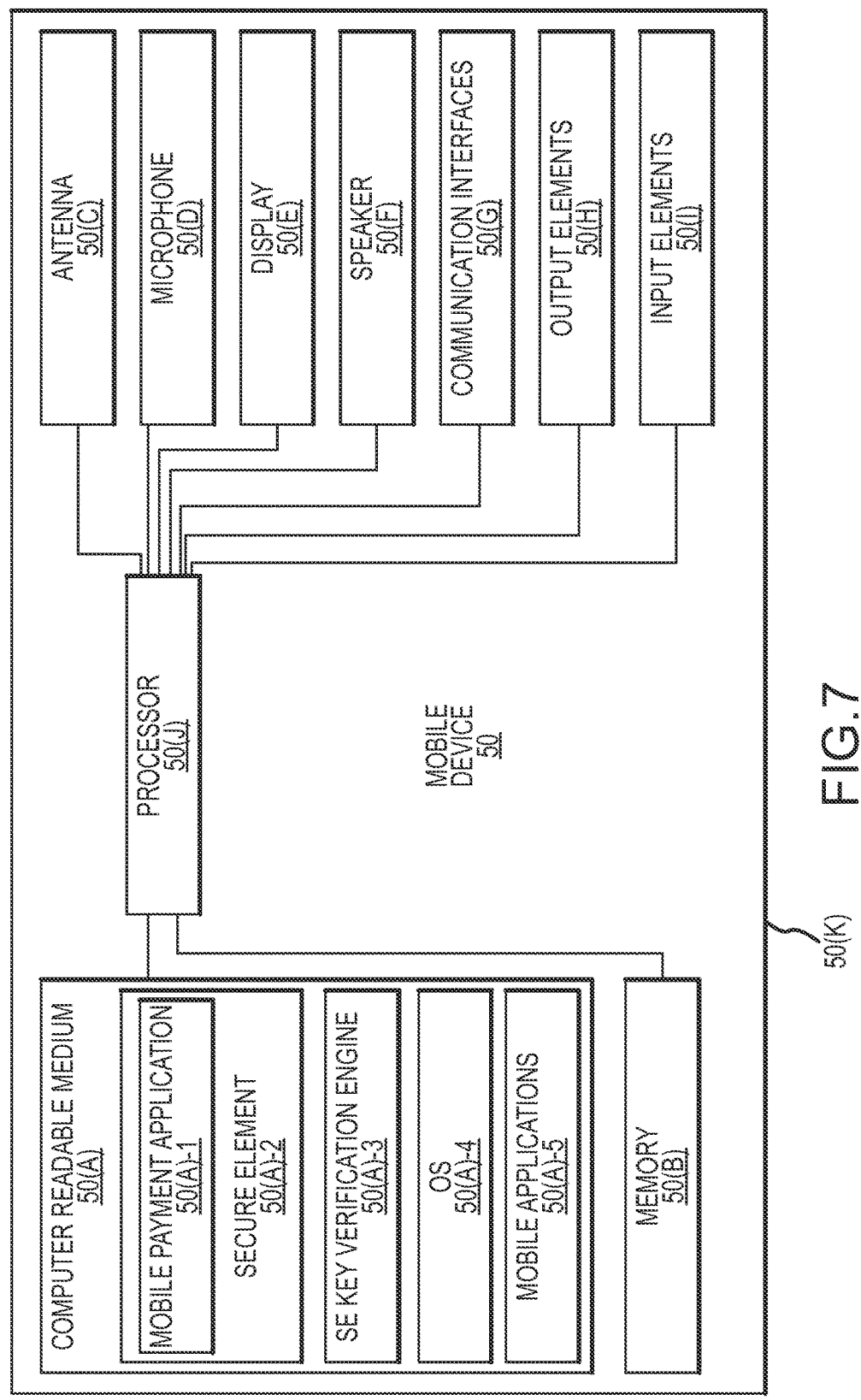
FIG. 7 illustrates an exemplary mobile communication device capable of communicating with the system of FIG. 1.

Referring now to FIG. 7, a functional block diagram of a mobile communication device 50 according to an embodiment of the present invention is illustrated. As shown in FIG. 5, the mobile communication device 50 may be in the form of cellular phone, having a display 50(e) and input elements 50(i) to allow a user to input information into the device 50 (e.g., keyboard), memory 50(b). The mobile communication device 50 can also include a processor 50(k) (e.g., a microprocessor) for processing the functions of the mobile communication device 50, at least one antenna 50(c) for wireless data transfer, a microphone 50(d) to allow the user to transmit his/her voice through the mobile communication device 50, and speaker 50(f) to allow the user to hear voice communication, music, etc. In addition, the mobile communication device 50 may include one or more interfaces in addition to antenna 50(c), e.g., a wireless interface coupled to an antenna. The communications interfaces 50(g) can provide a near-field communication interface (e.g., contactless interface, Bluetooth, optical interface, etc.) and/or wireless communications interfaces capable of communicating through a cellular network, such as GSM, or through WiFi, such as with a wireless local area network (WLAN). Accordingly, the mobile communication device 50 may be capable of transmitting and receiving information wirelessly through both short range, radio frequency (RF) and cellular and WiFi connections.

Additionally, the mobile communication device 50 can be capable of communicating with a global positioning system (GPS) in order to determine to location of the mobile communication device. In the embodiment shown in FIG. 5, antenna 50(c) may comprise a cellular antenna (e.g., for sending and receiving cellular voice and data communication, such as through a network such as a 3G or 4G network), and interfaces 50(g) may comprise one or more local communication. In other embodiments contemplated herein, communication with the mobile communication device 50 may be conducted with a single antenna configured for multiple purposes (e.g., cellular, transactions, etc.), or with further interfaces (e.g., 3, 4, or more separate interfaces).

The mobile communication device 50 can also include a computer readable medium 50(a) coupled to the processor 50(k), which stores application programs and other computer code instructions for operating the device, such as an operating system (OS) 50(a)-4. In an embodiment of the present invention, the computer readable medium 50(a) can include a mobile payment application 50(a)-1. The mobile payment application 50(a)-1 can be accessed only when a secure element 50(a)-2 of the computer readable medium 50(a) is accessed, such as through communication with a trusted service manager. In addition, the application can include a customizable user interface (UI), which can be determined by the user's preferences through application level programming. These preferences can be securely communicated through the antenna element 50(c) to an issuer of the account stored in the application. The application can be used to securely complete contactless payments through account stored on the mobile communication device and/or in a mobile wallet associated with the user of the mobile communication device 50(k).

Referring again to FIG. 7, the computer readable medium 50(a) can also include a secure element (SE) 50(a)-2, which can be an encrypted memory element of the computer readable medium 50(a). The SE 50(a)-2 can be accessed through an SE Key Verification Engine 50(a)-3, which can also be located in the computer readable medium 50(a). The SE Key Verification Engine 50(a)-3 can receive keys from contactless communication, e.g., antenna 30(c) and either grant or deny access to the SE 50(a)-2.

The computer readable medium 50(a) on the mobile communication device 30 can also include additional mobile applications 50(a)-5, which can be downloaded by a user of the mobile communication device 50(k). The mobile communication device 50 can additionally include an integrated camera 50(j), capable of capturing images and/or video. In certain embodiments, the mobile communication device 50 may include a non-transitory computer readable storage medium, e.g., memory 50(b), for storing data saved on the mobile communication device 50(k).

The above description is illustrative and is not restrictive. Many variations of the invention may become apparent to those skilled in the art upon review of the disclosure. The scope of the invention may, therefore, be determined not with reference to the above description, but instead may be determined with reference to the pending claims along with their full scope or equivalents.

It may be understood that the present invention as described above can be implemented in the form of control logic using computer software in a modular or integrated manner. Based on the disclosure and teachings provided herein, a person of ordinary skill in the art may know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A method for processing messages related to mobile payment applications on secure elements of mobile communication devices through an interconnectivity services hub, the method comprising:
   storing, by a server computer, a routing table including addresses for routing messages;
   storing, by the server computer, protocol adapting information for translating messages into a plurality of protocols for communications with different trusted service managers;
   receiving, by the server computer, application personalization information from an application personalization preparation service, the application personalization information generated using a master key;
   receiving, by the server computer, a first message for a first trusted service manager computer from a first entity computer, the first message being in a first protocol, the first message related to a first mobile payment application on a first secure element of a first mobile communication device, wherein the first trusted service manager computer communicates with secure elements using a second protocol;
   determining, by the server computer, that the first message received from the first entity computer is in the first protocol;
   determining, by the server computer using the first message, that the first trusted service manager computer is a recipient of the first message;
   determining, by the server computer, that the second protocol is associated with the first trusted service manager computer;
   determining, by the server computer using the routing table, an address of the first trusted service manager computer;
   translating, by the server computer using the protocol adapting information, the first message into a first translated message in the second protocol used by the first trusted service manager computer;
   sending, by the server computer, the first translated message and the application personalization information to the first trusted service manager computer using the routing table and the address of the first trusted service manager computer, wherein the first trusted service manager computer uses the application personalization information to provision a new payment application on the first secure element;
   receiving, by the server computer, a second message for a second trusted service manager computer from the first entity computer, the second message being in the first protocol, the second message related to a second mobile payment application on a second secure element of a second mobile communication device, wherein the second trusted service manager computer communicates with secure elements using a third protocol;
   determining, by the server computer, that the second message received from the first entity computer is in the first protocol;
   determining, by the server computer using the second message, that the second trusted service manager computer is a recipient of the second message;
   determining, by the server computer, that the third protocol is associated with the second trusted service manager computer;
   determining, by the server computer using the routing table, an address of the second trusted service manager computer;
   translating, by the server computer using the protocol adapting information, the second message into a second translated message in the third protocol used by the second trusted service manager computer; and
   sending, by the server computer, the second translated message to the second trusted service manager computer using the routing table and the address of the second trusted service manager computer.

2. The method of claim 1, wherein the first message provides value added services for the first mobile payment application on the first secure element of the first mobile communication device.

3. The method of claim 1, wherein the first entity computer is an issuer.

4. The method of claim 1, wherein the first message includes a request, and wherein the request includes adding, deleting, activating, unlocking, locking, reissuing, replacing, or updating the first mobile payment application on the first secure element.

5. The method of claim 1, wherein the first entity computer is an issuer, a trusted service manager associated with the issuer, a wallet provider, or a mobile network operator.

6. The method of claim 1, wherein translating the first message into the second protocol further comprises:
   identifying the first entity computer;
   determining a request by comparing the first message to a first entity protocol mapping; and
   mapping information in the first message according to a first secure element trusted service manager protocol mapping for the request.

7. The method of claim 1, further comprising:
   determining a request based on commands in the first message; and
   generating information based on a first secure element trusted service manager protocol mapping for the request, wherein the first translated message includes the generated information.

8. The method of claim 1, further comprising:
   receiving, by the server computer, a third message for a third trusted service manager computer from a second entity computer, the third message being in a fourth protocol, the third message related to a third mobile payment application on a third secure element of a third mobile communication device, wherein the third trusted service manager computer communicates with secure elements using a fourth protocol;

determining a request based on commands in the third message;

generating a plurality of translated messages based on a range of available trusted service manager requirements; and selecting a third translated message from the plurality of translated messages, the third translated message being translated to the fourth protocol for the third trusted service manager computer associated with the third secure element.

9. The method of claim 1, wherein the routing table comprises identifiers, addresses, protocol indicators, and relationship information for each of the first entity computer, the first trusted service manager computer, and the second trusted service manager computer.

10. The method of claim 1, further comprising:
decoding, by the server computer, the first message using a first stored key for messages from the first entity computer; and
encoding, by the server computer, the first translated message using a second stored key for messages for the first trusted service manager computer.

11. The method of claim 1, further comprising requesting, by the server computer, the first entity computer to include additional information in the first message, wherein the translating of the first message into the second protocol is based on the additional information included in the first message.

12. The method of claim 1, wherein the application personalization information includes a unique derived key that is generated using a mobile payment application identifier that is unique to the first mobile payment application.

13. A server computer comprising:
a processor; and
a non-transitory computer readable medium coupled to the processor, the non-transitory computer readable medium comprising code executable by the processor for implementing a method for processing messages related to mobile payment applications on secure elements of mobile communication devices through an interconnectivity services hub, the method comprising:
storing a routing table including addresses for routing messages;
storing protocol adapting information for translating messages into a plurality of protocols for communications with different trusted service managers;
receiving application personalization information from an application personalization preparation service, the application personalization information generated using a master key;
receiving a first message for a first trusted service manager computer from a first entity computer, the first message being in a first protocol, the first message related to a first mobile payment application on a first secure element of a first mobile communication device, wherein the first trusted service manager computer communicates using a second protocol;
determining that the first message received from the first entity computer is in the first protocol;
determining, using the first message, that the first trusted service manager computer is a recipient of the first message;
determining that the second protocol is associated with the first trusted service manager computer;

determining, using the routing table, an address of the first trusted service manager computer;
translating, using the protocol adapting information, the first message into a first translated message in the second protocol used by the first trusted service manager computer;
sending the first translated message and the application personalization information to the first trusted service manager computer using the routing table and the address of the first trusted service manager computer, wherein the first trusted service manager computer uses the application personalization information to provision a new payment application on the first secure element;
receiving a second message for a second trusted service manager computer from the first entity computer, the second message being in the first protocol, the second message related to a second mobile payment application on a second secure element of a second mobile communication device, wherein the second trusted service manager computer communicates using a third protocol;
determining, by the server computer, that the second message received from the first entity computer is in the first protocol;
determining, by the server computer using the second message, that the second trusted service manager computer is a recipient of the second message;
determining, by the server computer, that the third protocol is associated with the second trusted service manager computer;
determining, by the server computer using the routing table, an address of the second trusted service manager computer;
translating, using the protocol adapting information, the second message into a second translated message in the third protocol used by the second trusted service manager computer; and
sending the second translated message to the second trusted service manager computer using the routing table and the address of the second trusted service manager computer.

14. The server computer of claim 13, wherein the first message allows the first entity computer to provide value added services for a stored payment account on the first mobile communication device.

15. The server computer of claim 13, wherein the first entity computer is an issuer.

16. The server computer of claim 13, wherein the first message includes a request, wherein the request includes adding, deleting, activating, unlocking, locking, reissuing, replacing, or updating the first mobile payment application on the first secure element.

17. The server computer of claim 13, wherein the first entity computer is an issuer, a trusted service manager associated with an issuer, a wallet provider, or a mobile network operator.

18. The server computer of claim 13, wherein translating the first message into the second protocol further comprises:
identifying the first entity computer;
determining a request by comparing the first message to a first entity protocol mapping; and
mapping information in the first message according to a second entity protocol mapping for the request.

19. The server computer of claim 13, wherein the method further comprises:

determining a request based on commands in the first message; and generating information based on a second entity protocol mapping for the request, wherein the first translated message includes the generated information.

20. The server computer of claim 13, wherein the method further comprises:

receiving a third message for a third trusted service manager computer from a second entity computer, the third message being in a fourth protocol, the third message related to a third mobile payment application on a third secure element of a third mobile communication device, wherein the third trusted service manager computer communicates with secure elements using a fourth protocol;

determining a request based on commands in the third message;

generating a plurality of translated messages based on a range of available trusted service manager requirements; and selecting a third translated message from the plurality of translated messages, the third translated message being translated to the fourth protocol for the third trusted service manager computer associated with the third secure element.

21. The server computer of claim 13, wherein the routing table comprises identifiers, addresses, protocol indicators, and relationship information for each of the first entity computer, the first trusted service manager computer, and the second trusted service manager computer.

* * * * *

UNITED STATES PATENT AND TRADEMARK OFFICE
CERTIFICATE OF CORRECTION

| | | |
|---|---|---|
| PATENT NO. | : 10,373,152 B2 | Page 1 of 2 |
| APPLICATION NO. | : 13/713938 | |
| DATED | : August 6, 2019 | |
| INVENTOR(S) | : Oleg Makhotin, Eduardo Lopez and Erick Wong | |

It is certified that error appears in the above-identified patent and that said Letters Patent is hereby corrected as shown below:

On the Title Page

Inventors item (72) please remove "Oleg Makhotin, Danville (CA);" and insert -- Oleg Makhotin, Castro Valley, CA (US); --

In the Claims

In Column 41, Line 32 please remove "translating messages" and insert -- translating the messages --

In Column 41, Line 57 please remove "table, an address" and insert -- table, a first address --

In Column 41, Line 66 please remove "table and the address" and insert -- table and the first address --

In Column 42, Line 11 please remove "with secure elements" and insert -- with the secure elements --

In Column 42, Line 17 please remove "is a recipient of" and insert -- is the recipient of --

In Column 42, Line 30 please remove "and the address of" and insert -- and the second address of --

In Column 43, Line 14 please remove "identifiers, address," and insert -- identifiers, the addresses --

In Column 43, Line 20 please remove "key for messages" and insert -- key for the messages --

In Column 43, Line 23 please remove "key for messages" and insert -- key for the messages --

In Column 43, Lines 44-45 please remove "for routing messages;" and insert -- for routing the messages; --

Signed and Sealed this
Third Day of March, 2020

Andrei Iancu
*Director of the United States Patent and Trademark Office*

CERTIFICATE OF CORRECTION (continued)
U.S. Pat. No. 10,373,152 B2

In Column 43, Lines 46-47 please remove "for translating messages;" and insert -- for translating the messages; --

In Column 44, Line 1 please remove "routing table, an address" and insert -- routing table, a first address --

In Column 44, Line 10 please remove "the address of" and insert -- the first address of --

In Column 44, Line 34 please remove "table, an address" and insert -- table, a second address --

In Column 44, Line 42 please remove "and the address of" and insert -- and the second address --

In Column 45, Line 15 please remove "using a fourth" and insert -- using the fourth --

In Column 45, Line 27 please remove "identifiers, addresses," and insert -- identifiers, the addresses --